United States Patent
Hanai et al.

(10) Patent No.: US 8,195,777 B2
(45) Date of Patent: Jun. 5, 2012

(54) SYSTEM AND METHOD FOR ADDING A STANDBY COMPUTER INTO CLUSTERED COMPUTER SYSTEM

(75) Inventors: Tomohiro Hanai, Yokohama (JP); Norihiro Hara, Kawasaki (JP); Tsunehiko Baba, Hachioji (JP)

(73) Assignee: Hitachi, Ltd., Tokyo (JP)

(*) Notice: Subject to any disclaimer, the term of this patent is extended or adjusted under 35 U.S.C. 154(b) by 238 days.

(21) Appl. No.: 12/071,774

(22) Filed: Feb. 26, 2008

(65) Prior Publication Data

US 2009/0172142 A1 Jul. 2, 2009

(30) Foreign Application Priority Data

Dec. 27, 2007 (JP) ................................. 2007-337232

(51) Int. Cl.
*G06F 15/177* (2006.01)

(52) U.S. Cl. ........ 709/221; 709/214; 709/215; 709/223; 709/224; 709/248; 714/6.23; 714/6.3

(58) Field of Classification Search .................. 709/214, 709/215, 221, 223, 224, 248; 714/6.23, 6.3
See application file for complete search history.

(56) References Cited

U.S. PATENT DOCUMENTS

| | | | | |
|---|---|---|---|---|
| 5,555,404 | A * | 9/1996 | Torbj.o slashed.rnsen et al. | .. 1/1 |
| 6,169,794 | B1 * | 1/2001 | Oshimi et al. | ......... 379/221.09 |
| 2002/0188711 | A1 * | 12/2002 | Meyer et al. | ................ 709/223 |
| 2004/0268177 | A1 * | 12/2004 | Ji et al. | ............................. 714/6 |
| 2005/0197718 | A1 * | 9/2005 | Shin et al. | ......................... 700/1 |
| 2006/0195607 | A1 * | 8/2006 | Naseh et al. | ................. 709/238 |
| 2006/0253731 | A1 * | 11/2006 | Petruzzo | .......................... 714/6 |
| 2007/0220059 | A1 * | 9/2007 | Lu et al. | ...................... 707/200 |

FOREIGN PATENT DOCUMENTS

JP    2005-251055    3/2004

* cited by examiner

*Primary Examiner* — Ario Etienne
*Assistant Examiner* — Michael C Lai
(74) *Attorney, Agent, or Firm* — Stites & Harbison, PLLC; Juan Carlos A. Marquez, Esq

(57) ABSTRACT

There is provided a method of adding a new computer as a standby computer to a computer system that includes an active computer for performing service processing and a standby computer for storing replica of data stored in the active computer. The replica of the data stored in the standby computer is updated when the data stored in the active computer is updated. The method comprising the steps of: selecting the standby computer from the computer system; transferring the replica of the data stored in the selected standby computer to the new computer; and transferring update information on data updated in the active computer after the transferring the replica of the data is started, to the new computer.

13 Claims, 28 Drawing Sheets

| ROW ID | COLUMN 1 | COLUMN 2 | | COLUMN n |
|---|---|---|---|---|
| 1 | A | B | ... | C |
| 2 | D | E | ... | F |
| : | : | : | ... | : |

FIG. 4A

| COMMIT SEQUENCE NUMBER |
|---|
| 10 |

FIG. 4B

| 551 | 552 | 553 | 554 | | | 550 |

| COMMIT SEQUENCE NUMBER | ROW ID | OPERATION TYPE | ROW DATA | | | |
|---|---|---|---|---|---|---|
| 10 | 1 | UPDATE | A' | B' | ... | C' |
| 10 | 2 | DELETE | / | / | / | / |
| 10 | 100 | INSERT | X | Y | ... | Z |
| : | : | : | : | : | ... | : |

FIG. 5

| 601 | 602 | 603 | 600 |

| SERVER NAME | IP ADDRESS | STATUS |
|---|---|---|
| SERVER A | 192.168.1.11 | ACTIVE |
| SERVER B | 192.168.1.12 | STANDBY |
| SERVER C | 192.168.1.13 | STANDBY |

FIG. 6

| SERVER NAME | CPU USAGE RATE | MEMORY USAGE RATE | NETWORK USAGE RATE |
|---|---|---|---|
| SERVER B | 80% | 30% | 50% |
| SERVER C | 60% | 30% | 40% |

| VIRTUAL SERVER NAME | MAXIMUM USAGE RATIO OF CPU | MAXIMUM USAGE RATIO OF MEMORY | MAXIMUM USAGE RATIO OF NETWORK |
|---|---|---|---|
| SERVER A | 40% | 40% | 40% |
| SERVER B | 40% | 40% | 40% |
| UNALLOCATED | 20% | 20% | 20% |

*FIG. 23*

SYSTEM AND METHOD FOR ADDING A STANDBY COMPUTER INTO CLUSTERED COMPUTER SYSTEM

CLAIM OF PRIORITY

The present application claims priority from Japanese patent application P 2007-337232 filed on Dec. 27, 2007, the content of which is hereby incorporated by reference into this application.

BACKGROUND OF THE INVENTION

This invention relates to a fault-tolerant computer system, and more particularly to a technique of adding a standby computer to the computer system.

In database systems, reliability can be ensured by a cluster configuration having a plurality of servers which include an active server for executing data processing and a standby server for taking over the data processing when a failure occurs in the active server. When a disk-based database (DB) is used, data is taken over by using a shared disk which can be referred to by the active server and the standby server, and the processing is continued by the standby server.

On the other hand, when an in-memory database is used, data is held in a memory included in each of the servers. Therefore, it is impossible for the servers to share a storage device to share the data. For this reason, the standby server holds, in its memory, a replica of database data of the active server, thereby making the data redundant.

When a failure occurs in a server and the server is separated from the cluster, data redundancy is reduced. If the system is kept running for a long time with the reduced data redundancy, a further failure may occur to cause system halt or data loss. Therefore, an online system in which a continuous operation is demanded needs to be prevented from being operated while data redundancy is insufficient. It is necessary that the data redundancy is recovered by restoring the server in which the failure has occurred, to the cluster or by adding a new server to the cluster, to continuously operate the system in a stable manner.

JP 2005-251055 A discloses a technique of promptly recovering redundancy, in which devices that form a pair monitor each other, and, when one of the devices detects a failure occurred in the other, a new pair is automatically determined.

In a cluster configuration in which database data is held in data areas independently by the active server and the standby server, when a new standby server is added, it is required to synchronize data held by the new standby server with data held by the active server. The data synchronization indicates a state in which the data held by the active server can be generated by the standby server. Specifically, the standby server may hold data identical to the data held by the active server or different data from which the data held by the active server can be generated. In the latter case, for example, when the standby server holds an update log for database data held by the active server, the database data held by the active server can be generated by the standby server.

However, to make a replica of the database data held by the active server in the new standby server ensuring data consistency, update processing in the database of the active server needs to be temporarily stopped (a frozen image of the database of the active server needs to be created). In that case, it is also necessary to temporarily stop processing of requesting the active server to perform the database update processing.

JP 2005-251055 A does not describe making a replica of data in a newly-added device. US 2006/0253731 A discloses a technique, in which, in order to make a backup of data without disturbing an operation of an active server, first and second standby servers are prepared, and, when a database of the active server is synchronized with a database of the first standby server, update of the first standby server is stopped and the data of the first standby server is replicated to the second standby server.

SUMMARY OF THE INVENTION

With the technique disclosed in US 2006/0253731 A, the first standby server buffers an update content and applies the update content to its data after the replication of data for the second standby server is completed, so the first standby server is synchronized again with the active server. However, because the second standby server cannot apply an update content made in the active server after the replica was made, the database data of the second standby server cannot be synchronized with the database data of the active server.

It is therefore an object of this invention to provide a technique of synchronizing data held by a newly-added standby server with data held by an active server without stopping the active server.

A representative aspect of this invention is as follows. That is, there is provided a method of adding a new computer as a standby computer to a computer system that includes an active computer for performing service processing and a standby computer for storing replica of data stored in the active computer. The replica of the data stored in the standby computer is updated when the data stored in the active computer is updated. The method comprising the steps of: selecting the standby computer from the computer system; transferring the replica of the data stored in the selected standby computer to the new computer; and transferring update information on data updated in the active computer after the transferring the replica of the data is started, to the new computer.

According to an aspect of this invention, it is possible to add a new computer as a standby computer synchronized with an active computer, to a computer system, without stopping the processing of the active computer.

BRIEF DESCRIPTION OF THE DRAWINGS

The present invention can be appreciated by the description which follows in conjunction with the following figures, wherein:

FIG. 4A is an explanatory diagram showing example of information (a table used for service processing) stored in the database in accordance with the first embodiment of this invention;

FIG. 4B is an explanatory diagram showing example of information (a commit sequence number) stored in the database in accordance with the first embodiment of this invention;

FIG. 5 is a diagram showing an example of log information in accordance with the first embodiment of this invention;

FIG. 6 is a diagram showing an example of a cluster configuration table used to manage statuses in the cluster in accordance with the first embodiment of this invention;

FIG. 23 is a diagram showing an example of a resource usage setting table held by the resource usage control module in accordance with the fifth embodiment of this invention;

DETAILED DESCRIPTION OF THE PREFERRED EMBODIMENTS

Hereinafter, embodiments of this invention will be described with reference to the accompanying drawings.

First Embodiment

Figure 1:
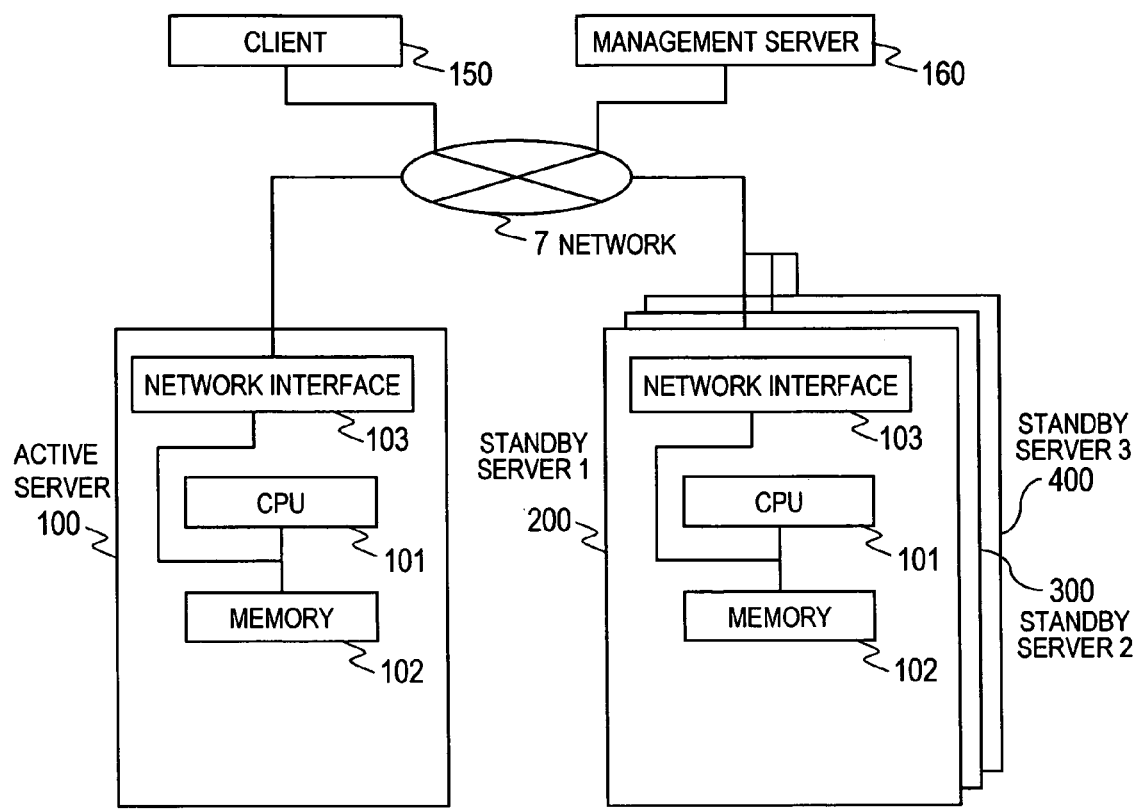
FIG. 1 is a block diagram showing a hardware configuration of a computer system in accordance with a first embodiment of this invention.

FIG. 1 is a block diagram showing a hardware configuration of a computer system according to a first embodiment of this invention.

The computer system according to the first embodiment of this invention includes an active server 100, standby servers 200, 300, and 400, a client 150, and a management server 160. The active server 100, the standby servers 200, 300, and 400, the client 150, and the management server 160 are coupled through a network 7. The network 7 may be an IP network. When the servers are blade servers, the network 7 may be an internal bus.

The computer system according to the first embodiment of this invention has a cluster configuration including the active server 100, which provides a database service, and one or more standby servers (200, 300, and 400), which take over the service of the active server 100 when a failure has occurred in the active server 100.

The management server 160 manages the active server 100 and the standby servers 200, 300, and 400. The client 150 uses a database operated by the active server 100.

The active server 100 includes a CPU 101, a memory 102, and a network interface 103. The standby servers 200, 300, and 400 have the same configuration as the active server 100. It should be noted that the same reference numerals as in the active server 100 are used for components such as CPUs included in the standby servers.

The CPU 101 executes various types of arithmetic processing. The memory 102 stores a program such as that for a database management system, data used for the various types of arithmetic processing, and data managed by the database management system. The network interface 103 is used to communicate with the other computers through the network 7.

Figure 2:
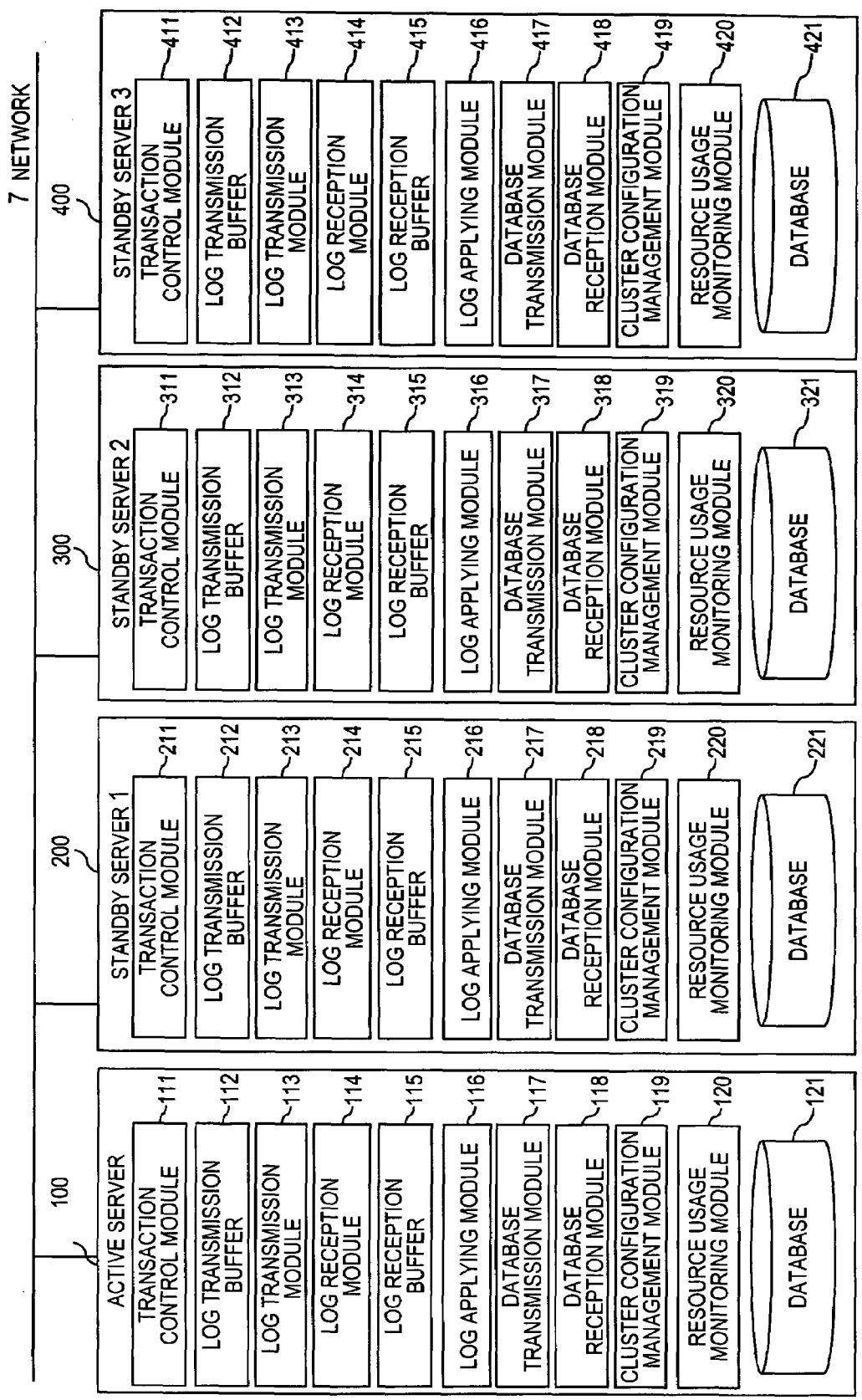
FIG. 2 is a functional block diagram mainly showing software of a database system having the cluster configuration in accordance with the first embodiment of this invention.

FIG. 2 is a functional block diagram mainly showing software of a database system having the cluster configuration according to the first embodiment of this invention.

The active server 100 and the standby servers 200, 300, and 400 have the same components in order that the active server 100 acts as a standby server and that the standby servers 200, 300, and 400 act as active servers. Components that are not used when the active server 100 acts as the active server may be generated when the active server 100 starts to act as a standby server. Similarly, components that are not used when the standby servers 200, 300, and 400 act as the standby servers may be generated when the standby servers 200, 300, and 400 start to act as active servers.

In FIG. 2, reference numerals 111 to 121 are assigned to the components of the active server 100, reference numerals 211 to 221 are assigned to the components of the standby server 200, reference numerals 311 to 321 are assigned to the components of the standby server 300, and reference numerals 411 to 421 are assigned to the components of the standby server 400. Functions of the components of the active server 100 will be described below. The components of the standby servers 200, 300, and 400 also have the same functions unless otherwise specified.

The active server 100 includes a transaction control module 111, a log transmission buffer 112, a log transmission module 113, a log reception module 114, a log reception buffer 115, a log applying module 116, a database transmission module 117, a database reception module 118, a cluster configuration management module 119, a resource usage monitoring module 120, and a database 121. Each of the transaction control module 111, the log transmission module 113, the log reception module 114, the log applying module 116, the database transmission module 117, the database reception module 118, the cluster configuration management module 119, and the resource usage monitoring module 120 includes a program, and the CPU 101 executes the program to perform each corresponding processing.

In the database system shown in FIG. 2, the transaction control module 111 of the active server 100 receives a database operation request from the client 150, performs an operation in the database 121, and transmits a result to the client 150.

In the active server 100, when the transaction control module 111 updates the database 121, the transaction control module 111 writes a log indicating the update content to the log transmission buffer 112. The log transmission module 113 transmits the log written to the log transmission buffer 112, to the standby servers 200, 300, and 400.

The cluster configuration management module 119 manages the statuses of the active server 100 and the standby servers 200, 300, and 400. In order to manage the statuses of the other type of servers, the cluster configuration management module 119 has a function of communicating with the cluster configuration management modules of the other type of servers and with the management server 160.

The resource usage monitoring module 120 monitors the usage level of resources such as the CPU, the memory, and the network bandwidth of the active server 100. Further, the resource usage monitoring module 120 has a function of communicating the monitored resource usage to the resource usage monitoring modules of the other type of servers and to the management server 160. It should be noted that the resource usage monitoring module 120 is used in a second embodiment of this invention.

In the standby server 200, a log reception module 214 receives the log from the active server 100 and writes the received log to a log reception buffer 215.

Further, in the standby server 200, a log applying module 216 reads, from the log reception buffer 215, the log written in the log reception module 214 and applies the log to a database 221. As described above, when the log is transmitted from the active server 100, the database 221 included in the standby server 200 can be synchronized with the database 121 included in the active server 100.

The statuses of the log applying module 216 include a log applying status and a log-applying start waiting status. The log applying status indicates a status of sequentially applying logs stored in the log reception buffer 215 to the database 221. The log-applying start waiting status indicates a waiting status in which logs remain stored in the log reception buffer 215.

Further, in the standby server 200, a database transmission module 217 transmits data of the database 221 to another standby server. A database reception module 218 receives data from another standby server and stores the data in the database 221.

Figure 3:
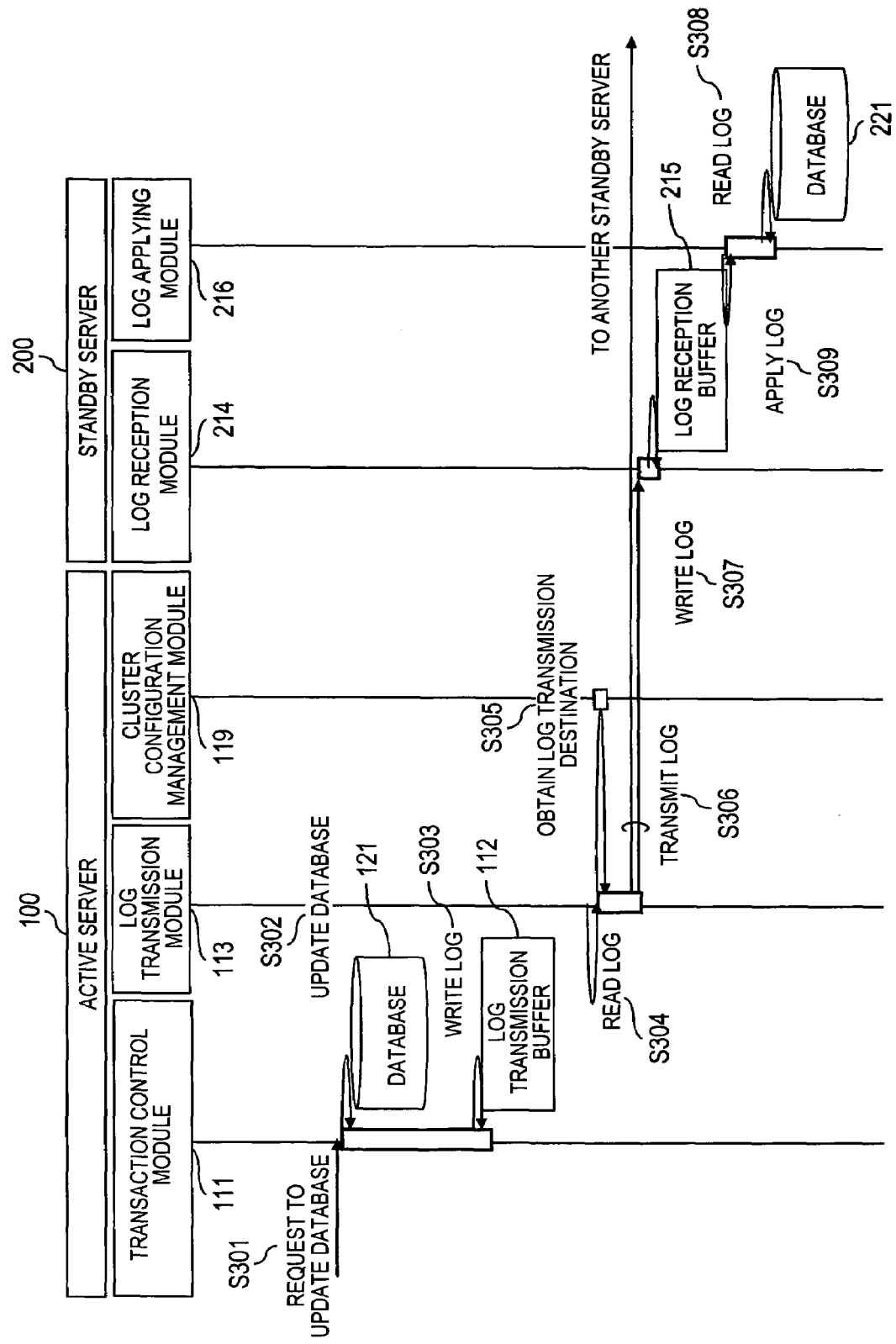
FIG. 3 is a sequence diagram showing database update processing performed when a database update request is transmitted from the client during a usual operation in accordance with the first embodiment of this invention.

FIG. 3 is a sequence diagram showing database update processing performed when a database update request is transmitted from the client 150 during a usual operation, according to the first embodiment of this invention.

The client 150 transmits a database update request to the transaction control module 111 of the active server 100 (S301).

When the database update request is received, the transaction control module 111 performs requested database update processing in the database 121 (S302). The transaction control module 111 writes a log corresponding to the update content of the database to the log transmission buffer 112 (S303).

The log transmission module 113 reads the log written in the step S303 from the log transmission buffer 112 (S304). Next, the log transmission module 113 obtains a log transmission destination list from the cluster configuration management module 119 (S305).

Further, the log transmission module 113 transmits the log read in the step S304 to the log reception modules of all standby servers included in the obtained log transmission destination list (S306). At the time of committing a database transaction, the log corresponding to the database transaction may be transmitted, or logs corresponding to a plurality of times of committing may be collectively transmitted.

When the log is received from the active server 100, the log reception module 214 of the standby server 200 writes the received log to the log reception buffer 215 (S307). The log applying module 216 is in the log applying status during the usual operation, and reads the log from the log reception buffer 215 (S308) and applies the read log to the database 221 (S309).

Through the processings of the steps S302 to S309, the update content of the database 121 of the active server 100 is applied to the database 221 of the standby server 200. In this way, synchronization is kept between the database 121 of the active server 100 and the database 221 of the standby server 200.

FIG. 4A and FIG. 4B are diagrams showing examples of information stored in the database 121 according to the first embodiment of this invention.

FIG. 4A shows an example of a table used for service processing. Columns 1 to n are defined by a user, and user data is stored in cells corresponding to the columns 1 to n of each row. A row ID is assigned to each row to uniquely identify the row.

FIG. 4B shows an example of a table storing a commit sequence number which is incremented every time a database transaction is committed.

FIG. 5 is a diagram showing an example of log information 550 according to the first embodiment of this invention.

The log information 550 includes a commit sequence number 551, a row ID 552, an operation type 553, and row data 554.

As described above with reference to FIG. 4B, the commit sequence number 551 is a number incremented every time a database transaction is committed. When a plurality of rows are inserted, updated, or deleted in a database transaction, the same commit sequence number is assigned to update contents applied in the same database transaction.

The row ID 552 is an identifier identifying an operated row. The operation type 553 indicates the type of an operation performed to the operated row. The operation type 553 indicates either one of "insert", "update", and "delete". When the operation type 553 indicates "insert", inserted row data is included as the row data 544. When the operation type 553 indicates "update", updated row data is included as the row data 544.

The log information 550 is generated, according to a database update request transmitted from the client 150, based on the row ID, the operation type, and the row data of the row which is a target of the database update request. Further, the commit sequence number assigned to the database transaction is assigned to a log. The standby server updates its database based on the row ID, the operation type, and the row data which are included in the log.

FIG. 6 is a diagram showing an example of a cluster configuration table 600 used to manage statuses in the cluster, in the first embodiment of this invention.

The cluster configuration table 600 is managed by the cluster configuration management module 119. The cluster configuration table 600 includes a server name 601, an IP address 602, and a status 603.

The server name 601 indicates the names of an active server and standby servers included in the cluster. The IP address 602 indicates the IP addresses of the servers corresponding to the server name 601.

The status 603 indicates the statuses of the servers corresponding to the server name 601. The statuses of a server include "active", "standby", and "being added". The "standby" status may be further classified depending on whether the standby server serves as the database replication source for a standby server to be added.

Figure 7:
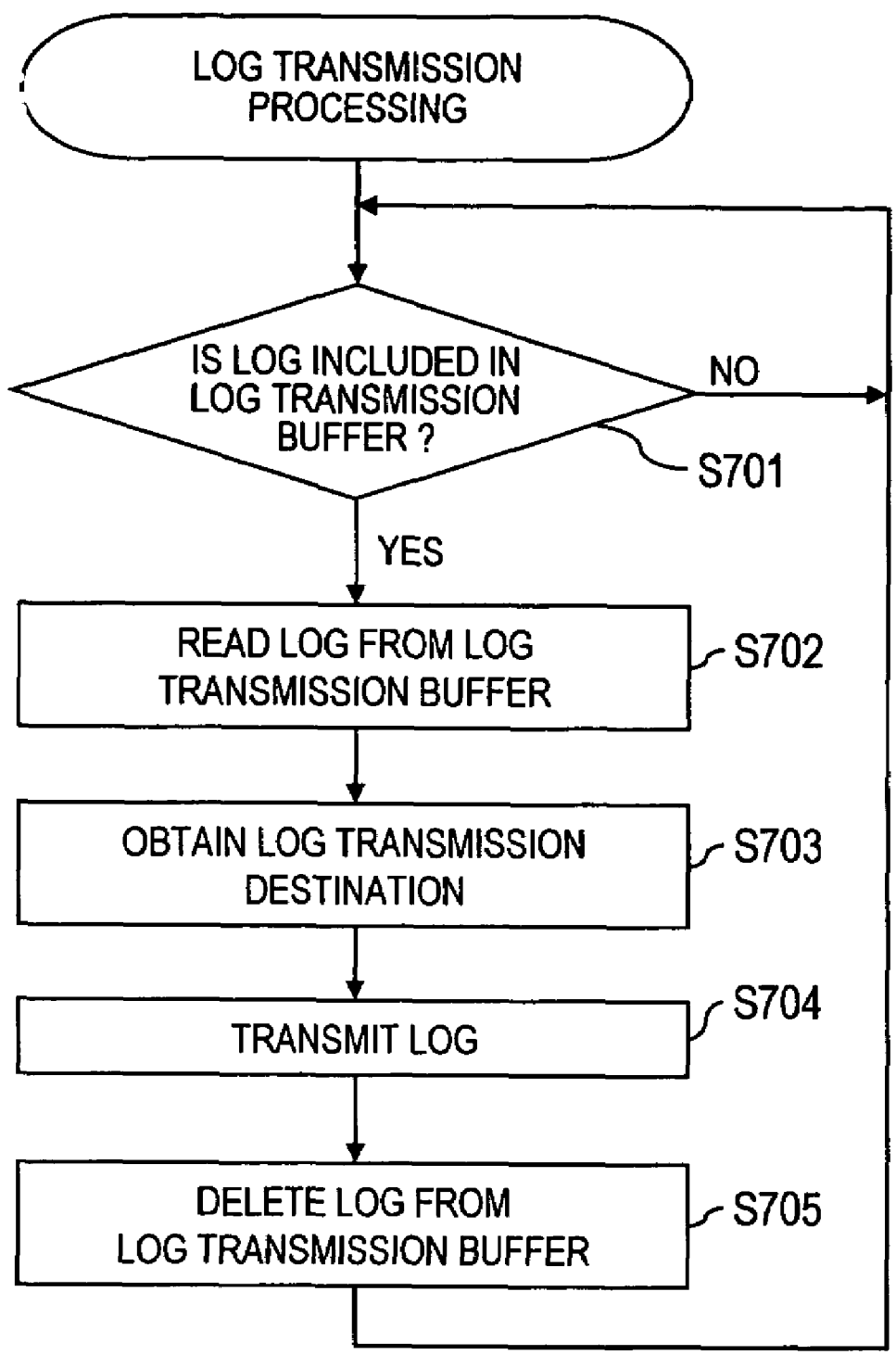
FIG. 7 is a flowchart showing a procedure of log transmission processing of the log transmission module of the active server in accordance with the first embodiment of this invention.

FIG. 7 is a flowchart showing a procedure of log transmission processing of the log transmission module 113 of the active server 100, according to the first embodiment of this invention.

The CPU 101 of the active server 100 executes the log transmission module 113 to determine whether a log is included in the log transmission buffer 112 (S701).

When a log is included in the log transmission buffer 112 ("Yes" in S701), the CPU 101 of the active server 100 reads the log from the log transmission buffer 112 (S702).

The CPU 101 of the active server 100 obtains a log transmission destination list from the cluster configuration management module 119 (S703) and transmits the log to a standby server included in the log transmission destination list (S704). Further, the CPU 101 of the active server 100 deletes the transmitted log from the log transmission buffer 112 (S705).

When a log is not included in the log transmission buffer 112 ("No" in S701), the CPU 101 of the active server 100 repeats determination of whether a log is included of the step S701 to wait until a log is written to the log transmission buffer 112.

Figure 8:
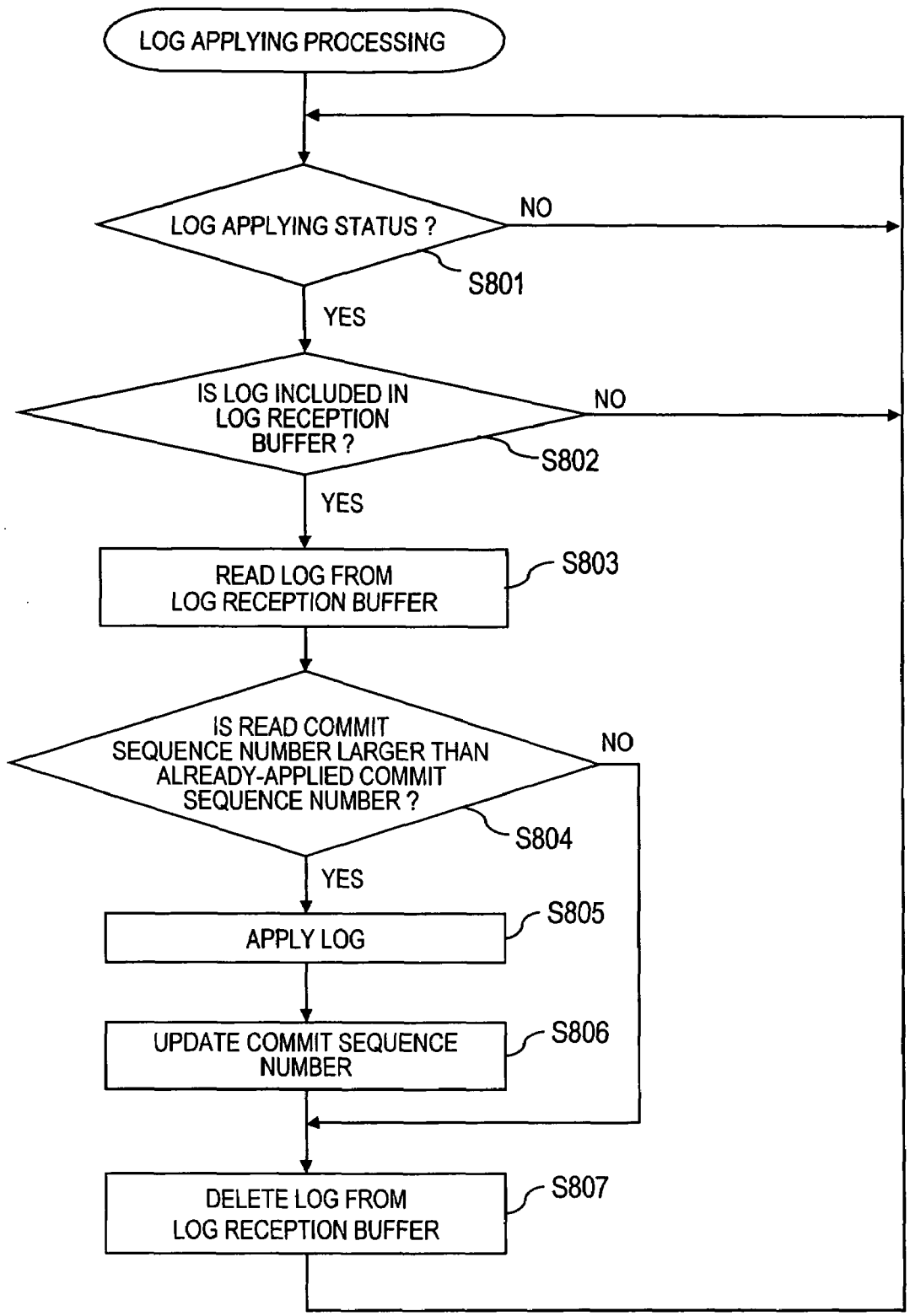
FIG. 8 is a flowchart showing a procedure of log applying processing of the log applying module of the standby server in accordance with the first embodiment of this invention.

FIG. 8 is a flowchart showing a procedure of log applying processing of the log applying module 216 of the standby server 200, according to the first embodiment of this invention.

The CPU 101 of the standby server 200 determines whether the log applying module 216 is in the "log applying status" (S801). When the log applying module 216 is not in the "log applying status" ("No" in S801), the CPU 101 of the standby server 200 waits until the log applying module 216 enters the "log applying status".

When the log applying module 216 is in the "log applying status" ("Yes" in S801), the CPU 101 of the standby server 200 determines whether a log is included in the log reception buffer 215 (S802). When a log is not included in the log reception buffer 215 ("No" in S802), the CPU 101 of the standby server 200 waits until a log is written to the log reception buffer 215.

When a log is included in the log reception buffer 215 ("Yes" in S802), the CPU 101 of the standby server 200 reads the log from the log reception buffer 215 (S803).

Further, the CPU 101 of the standby server 200 determines whether the commit sequence number contained in the read log is larger than the commit sequence number (already-applied commit sequence number) stored in the database 221 (S804). When the commit sequence number contained in the read log is larger than the already-applied commit sequence number ("Yes" in S804), the CPU 101 of the standby server 200 applies the log to the database 221 (S805). Further, the CPU 101 of the standby server 200 updates the commit sequence number of the database 221 to set it to the commit sequence number of the log (S806).

When the commit sequence number contained in the read log is equal to or smaller than the already-applied commit sequence number ("No" in S804), the CPU 101 of the standby server 200 does not apply the log or update the commit sequence number, to prevent the same log from being applied again. The CPU 101 of the standby server 200 deletes the read log from the log reception buffer 215 regardless of whether the log has been applied or not (S807).

Figure 9A:
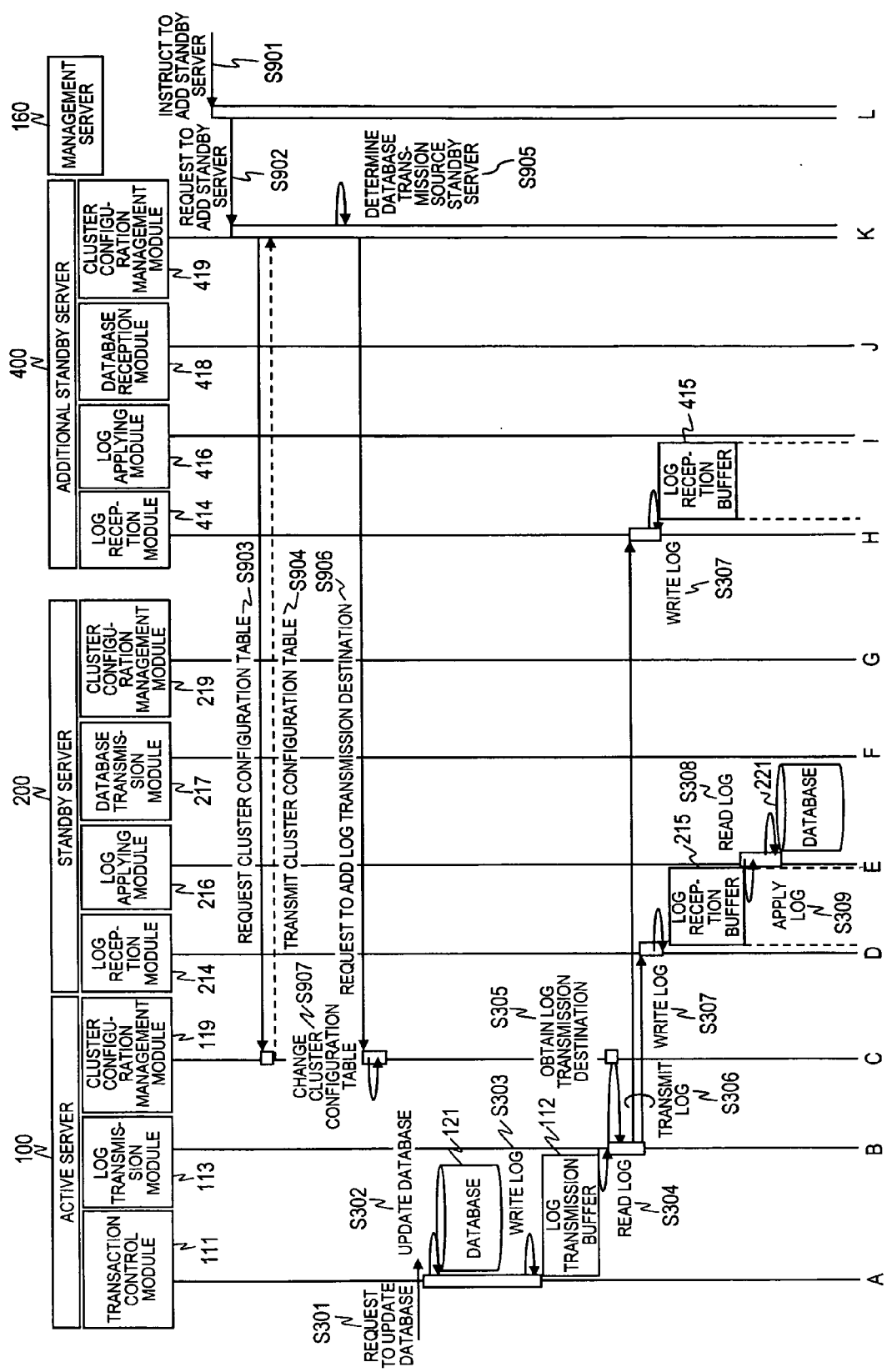
FIG. 9A and FIG. 9B are sequence diagrams showing processing of adding a standby server to the computer system in accordance with the first embodiment of this invention.
Figure 9B:
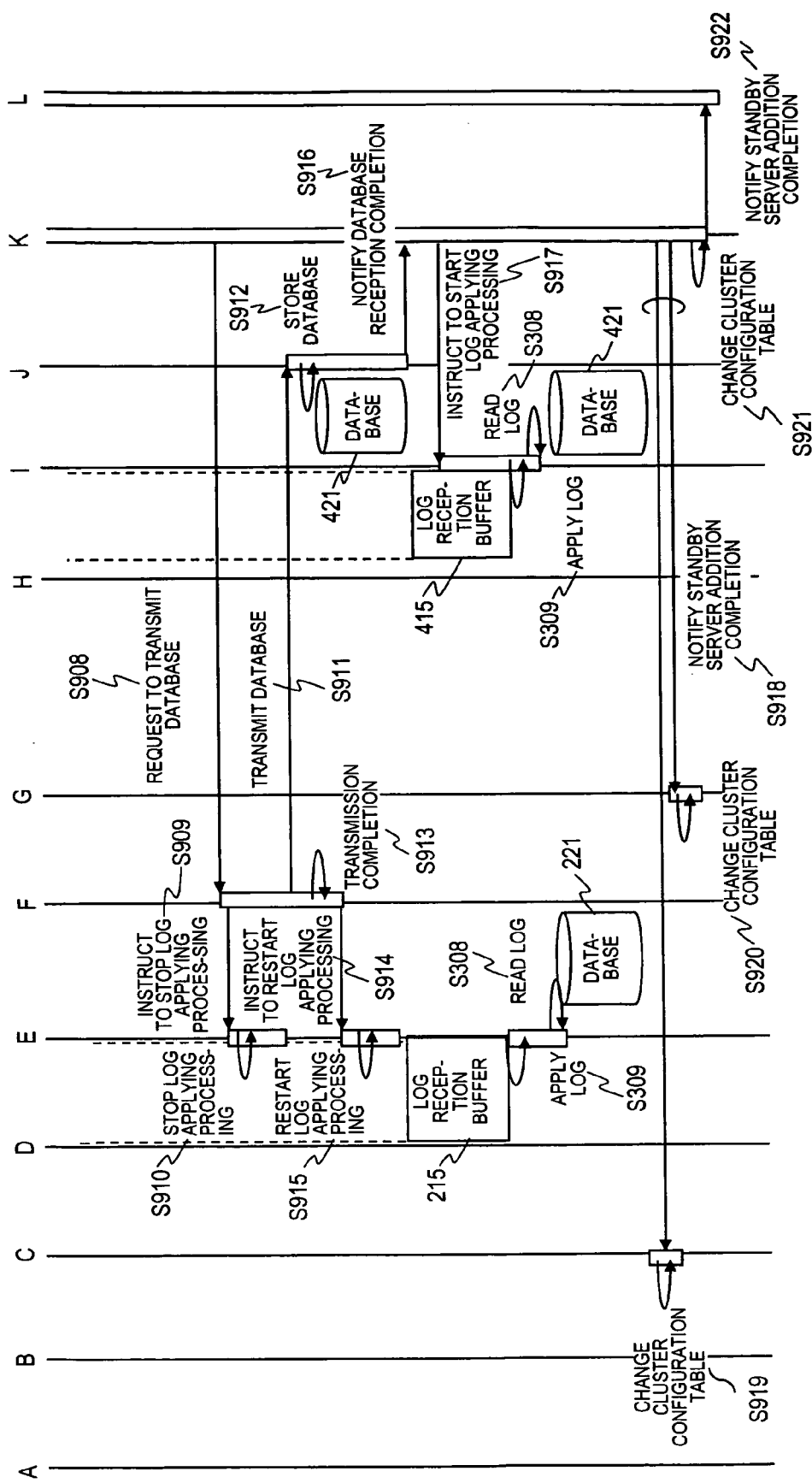

FIG. 9A and FIG. 9B are sequence diagrams showing processing of adding a standby server to the computer system according to the first embodiment of this invention.

The sequence diagrams of FIG. 9 and FIG. 9B show a procedure in which the standby server 400 is newly added when the databases of the two computers, the active server 100 and the standby server 200, are synchronized, and the database of the standby server 400 is synchronized with the databases of the active server 100 and the standby server 200 to allow the standby server 400 to act as a standby server.

First, a cluster administrator uses the management server 160 and instructs to add the standby server 400 (S901). At this time, the cluster administrator may specify a standby server serving as the database transmission source.

The management server 160 transmits a standby server addition request together with the IP address of the active server 100, to the standby server (additional standby server) 400 to be added to the cluster (S902).

When the standby server addition request is received, a cluster configuration management module 419 of the additional standby server 400 requests the cluster configuration management module 119 of the active server 100 to transfer the cluster configuration table (S903).

When the cluster configuration table transfer request is received, the cluster configuration management module 119 of the active server 100 transmits the cluster configuration table to the cluster configuration management module 419 of the additional standby server 400, which has requested the cluster configuration table (S904). At this time, the cluster configuration table contains entries of the servers included in the cluster configuration used before the additional standby server 400 is added. Specifically, the cluster configuration table contains entries of the active server 100 and the standby server 200.

When the cluster configuration table is received, the cluster configuration management module 419 of the additional standby server 400 selects and determines a database transmission source standby server from the cluster configuration table (S905). Specifically, the standby server 200, which is the only one standby server, is selected as the database transmission source standby server. When the administrator has specified the database transmission source standby server in the step S901, the specified standby server is selected as the database transmission source standby server.

Next, the cluster configuration management module 419 of the additional standby server 400 transmits a log transmission destination addition request to the cluster configuration management module 119 of the active server 100 (S906).

When the log transmission destination addition request is received, the cluster configuration management module 119 of the active server 100 adds an entry of the additional standby server 400 to the cluster configuration table (S907). The entry contains the server name and the IP address of the additional standby server 400 and the status of "being added". After the additional standby server 400 is added to the cluster configuration table of the active server 100, when the database 121 of the active server 100 is updated, a log is also transmitted to the additional standby server 400 in addition to the standby server 200. It should be noted that a log applying module 416 of the additional standby server 400 is in the "log-applying start waiting status" because replication of the database to which the transmitted log is to be applied has not been completed yet.

Processings of applying update data from the active server to the standby server, performed when a database update request for the database 121 of the active server 100 is issued, are the same as those of the steps S301 to S309 shown in FIG. 3. However, as described above, because the log applying module 416 of the additional standby server 400 is in the "log-applying start waiting status", a log received by a log reception module 414 is accumulated in a log reception buffer 415 until replication of the database is completed and log applying processing is started.

When the processing performed in response to the log transmission destination addition request of the step S906 is completed, the cluster configuration management module 419 of the additional standby server 400 transmits a database transmission request to the database transmission module 217 of the standby server 200, which has been selected in the step S905 (S908).

When the database transmission request is received, the database transmission module 217 of the standby server 200 instructs the log applying module 216 to stop log applying processing (S909). When the instruction to stop log applying processing is received, the log applying module 216 changes the status of the log applying module 216 to the "log-applying start waiting status". Thereafter, even when the log reception module 214 receives a new log, the received log is accumulated in the log reception buffer 215. Accordingly, the log applying processing of the log applying module 216 is stopped and a frozen image of the database 221 is created (S910).

When the log applying processing of the log applying module 216 is stopped, the database transmission module 217 of the standby server 200 transmits data of the database 221 to a database reception module 418 of the additional standby server 400 (S911). When the transmission of the data of the database 221 is completed (S913), the database transmission module 217 instructs the log applying module 216 to restart log applying processing (S914).

When the instruction to restart log applying processing is received, the log applying module 216 of the standby server 200 changes the status of the log applying module 216 to the "log applying status" (S915). When the status of the log applying module 216 is changed to the "log applying status", logs accumulated in the log reception buffer 215 are sequentially applied to the database 221, as shown in FIG. 8 (S308 and S309). Then, the database 121 of the active server 100 and the database 221 of the standby server 200 are again synchronized.

The database reception module 418 of the additional standby server 400 stores the data received from the database transmission module 217 of the standby server 200, in a database 421 (S912). When the database reception is completed, the database reception module 418 notifies the database reception completion to the cluster configuration management module 419 (S916).

When the database reception completion notification is received, the cluster configuration management module 419 of the additional standby server 400 instructs the log applying module 416 to start log applying processing (S917). When the instruction to start log applying processing is received, the log applying module 416 changes the status of the log applying module 416 from the "log-applying start waiting status" to the "log applying status". When the status of the log applying module 416 is changed to the "log applying status", logs accumulated in the log reception buffer 415 are sequentially applied to the database 421, as shown in FIG. 8 (S308 and S309). Then, the database 421 of the additional standby server 400 is synchronized with the database 121 of the active server 100.

The cluster configuration management module 419 of the additional standby server 400 transmits a standby server addition completion notification to the cluster configuration management module 119 of the active server 100 and a cluster configuration management module 219 of the standby server 200 (S918).

When the standby server addition completion notification is received, the cluster configuration management module 119 of the active server 100 changes the status in the entry of the additional standby server 400, added in the step S907, from "being added" to "standby" (S919). When the standby server addition completion notification is received, the cluster configuration management module 219 of the standby server 200 adds an entry of the additional standby server 400 to the cluster configuration table (S920). The entry contains the server name and the IP address of the additional standby server 400 and the status of "standby".

Further, the cluster configuration management module 419 of the additional standby server 400 adds an entry of the additional standby server 400 to the cluster configuration table (S921). The entry contains the server name and the IP address of the additional standby server 400 and the status of "standby". As a result, the cluster configuration tables of the active server 100, the standby server 200, and the additional standby server 400 also agree with each other. Then, the cluster configuration management module 419 notifies the standby server addition completion to the management server 160 (S922).

When the standby server addition completion is notified (S922), the management server 160 notifies the cluster administrator that the standby server addition processing has been completed. Although not shown in FIG. 9A and FIG. 9B, when the database reception module 418 reports the progress of database data reception and storage to the management server 160 and the log applying module 416 reports the number of logs stored in the log reception buffer 415 to the management server 160, the status of the standby server addition processing can be notified to the cluster administrator.

Figure 10:
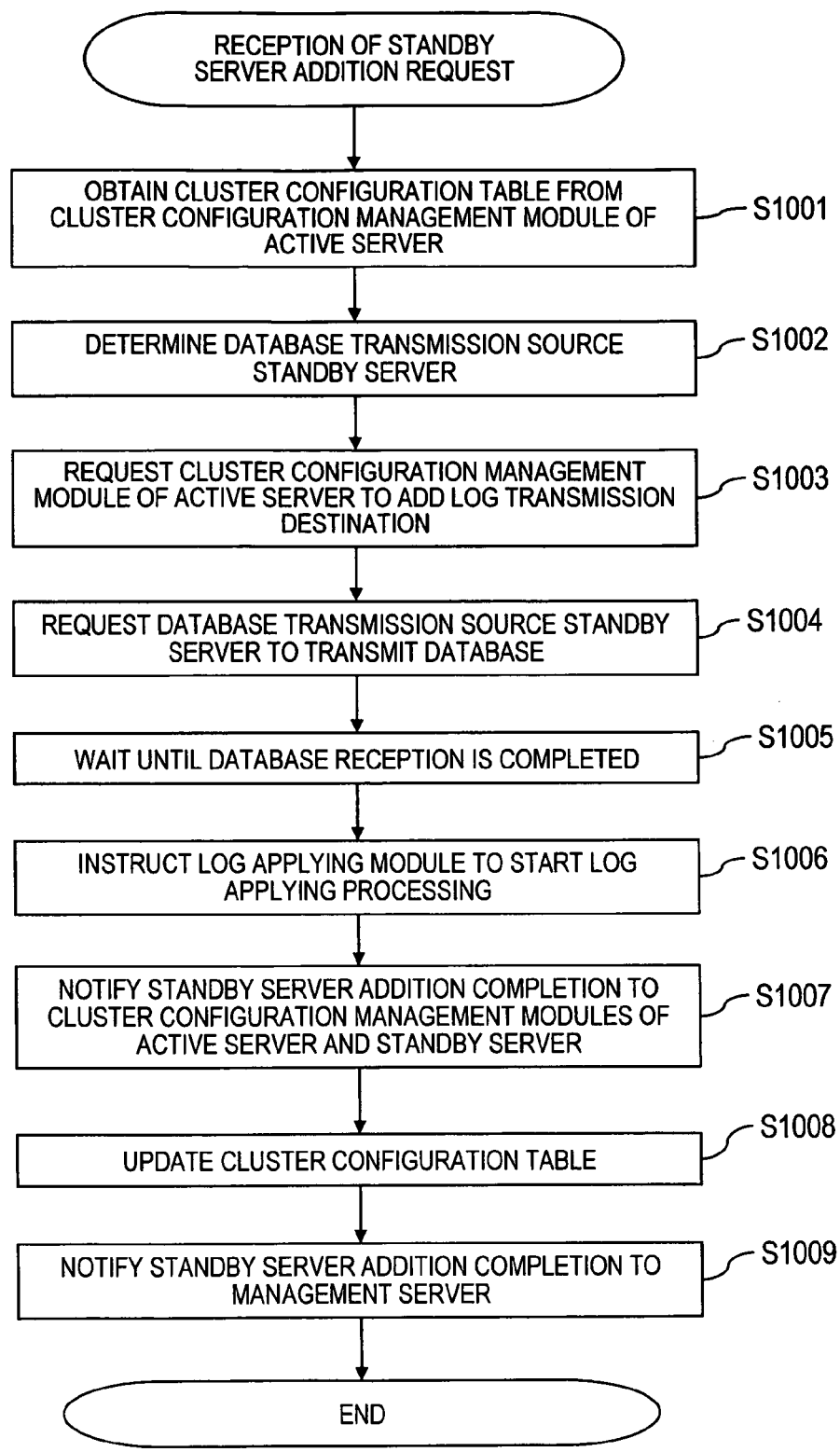
FIG. 10 is a flowchart showing a procedure of the standby server addition processing of the cluster configuration management module of the additional standby server in accordance with the first embodiment of this invention.

FIG. 10 is a flowchart showing a procedure of the standby server addition processing of the cluster configuration management module 419 of the additional standby server 400, according to the first embodiment of this invention.

When a standby server addition request is received, the CPU 101 of the additional standby server 400 requests the active server 100 to transmit the cluster configuration table and obtains the cluster configuration table (S1001 corresponding to S903 and S904 of FIG. 9A).

Next, the CPU 101 of the additional standby server 400 determines a standby server that serves as the database transmission source, based on information of the obtained cluster configuration table (S1002 corresponding to S905 of FIG. 9A). The standby server that serves as the database transmission source may be selected at random, or a standby server with the lowest load may be selected as the database transmission source standby server. Further, the CPU 101 of the additional standby server 400 transmits a log transmission destination addition request to the cluster configuration management module 119 of the active server 100 (S1003 corresponding to S906 of FIG. 9A).

The CPU 101 of the additional standby server 400 transmits a database transmission request to the database transmission module 217 of the database transmission source standby server, determined in the step S1002 (S1004 corresponding to S908 of FIG. 9B). The CPU 101 of the additional standby server 400 waits until reception of the database is completed in the database reception module 418 (S1005).

When the reception of the database is completed, the CPU 101 of the additional standby server 400 instructs the log applying module 416 to start log applying processing (S1006 corresponding to S916 and S917 of FIG. 9B).

Then, the CPU 101 of the additional standby server 400 transmits a standby server addition completion notification to the cluster configuration management modules of the active server and each of the standby server (S1007 corresponding to S918 of FIG. 9B). Further, the CPU 101 of the additional standby server 400 adds an entry of the additional standby server 400 to the cluster configuration table held in the cluster configuration management module 419 (S1008 corresponding to S921 of FIG. 9B). The entry contains the server name and the IP address of the additional standby server 400 and the status of "standby". Then, the CPU 101 of the additional standby server 400 notifies the standby server addition completion to the management server 160 (S1009 corresponding to S922 of FIG. 9B).

Figure 11:
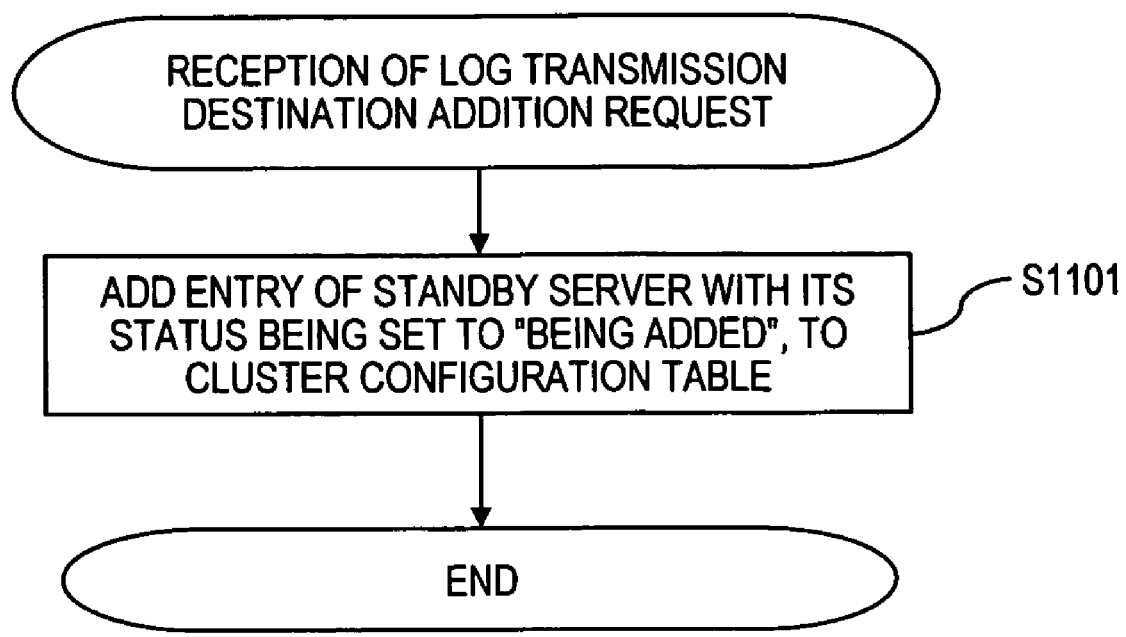
FIG. 11 is a flowchart showing a procedure of processing performed when the cluster configuration management module receives a log transmission destination addition request in the active server in accordance with the first embodiment of this invention.

FIG. 11 is a flowchart showing a procedure of processing performed when the cluster configuration management module 119 receives a log transmission destination addition request in the active server 100, according to the first embodiment of this invention.

When the cluster configuration management module 119 receives a log transmission destination addition request, the CPU 101 of the active server 100 adds, to the cluster configuration table, an entry which contains the server name and the IP address of the standby server 400 that has transmitted the log transmission destination addition request, and the status of "being added" (S1101 corresponding to S907 of FIG. 9A). After the entry of the standby server 400 to be newly added is added to the cluster configuration table, when the database 121 is updated in the active server 100, the update content is also applied to the standby server 400.

Figure 12:
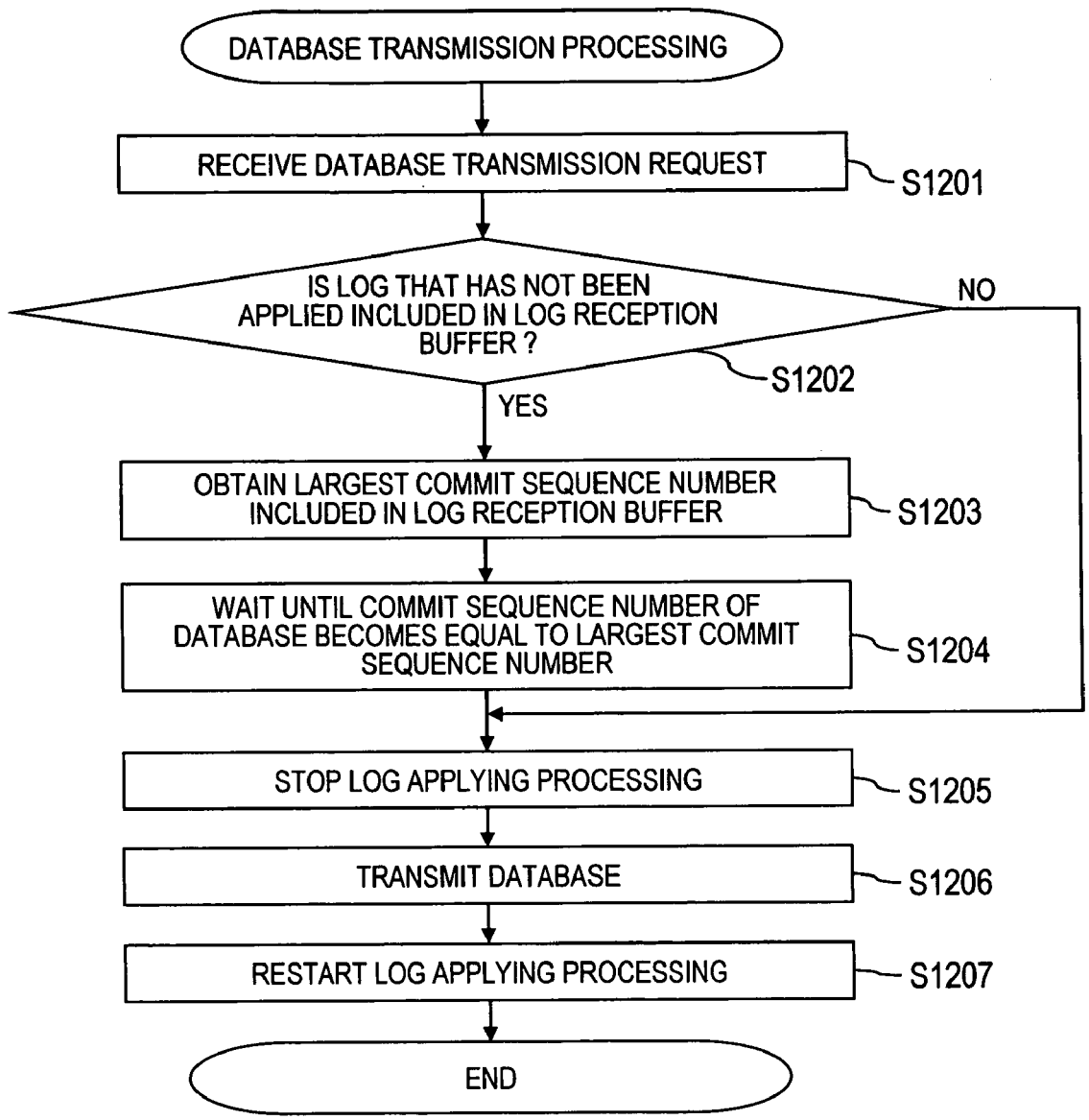
FIG. 12 is a flowchart showing a procedure of processing of the database transmission module of the standby server selected as a database transmission source in accordance with the first embodiment of this invention.

FIG. 12 is a flowchart showing a procedure of processing of the database transmission module 217 of the standby server 200 selected as a database transmission source in the first embodiment of this invention.

The CPU 101 of the standby server 200 uses the database transmission module 217 to receive a database transmission request (S1201 corresponding to S908 of FIG. 9B). Further, the CPU 101 of the standby server 200 determines whether a log that has not been applied to the database is included in the log reception buffer 215 (S1202).

When a log that has not been applied to the database is included in the log reception buffer 215 ("Yes" in S1202), the CPU 101 of the standby server 200 obtains the largest commit sequence number included in the log reception buffer 215 (S1203). Further, the CPU 101 of the standby server 200 waits until the commit sequence number of the database 221 becomes equal to the largest commit sequence number (S1204).

Next, the CPU 101 of the standby server 200 sets the log applying module 216 to the "log-applying start waiting status" to stop log applying processing (S1205 corresponding to S909 and S910 of FIG. 9B). The CPU 101 of the standby server 200 transmits data of the database 221 to the server that has transmitted the database transmission request (S1206 corresponding to S911 of FIG. 9B). When the transmission of the data of the database 221 is completed, the CPU 101 of the standby server 200 sets the log applying module 216 to the "log applying status" to restart log applying processing (S1207 corresponding to S913 and S914 of FIG. 9B).

Figure 13:
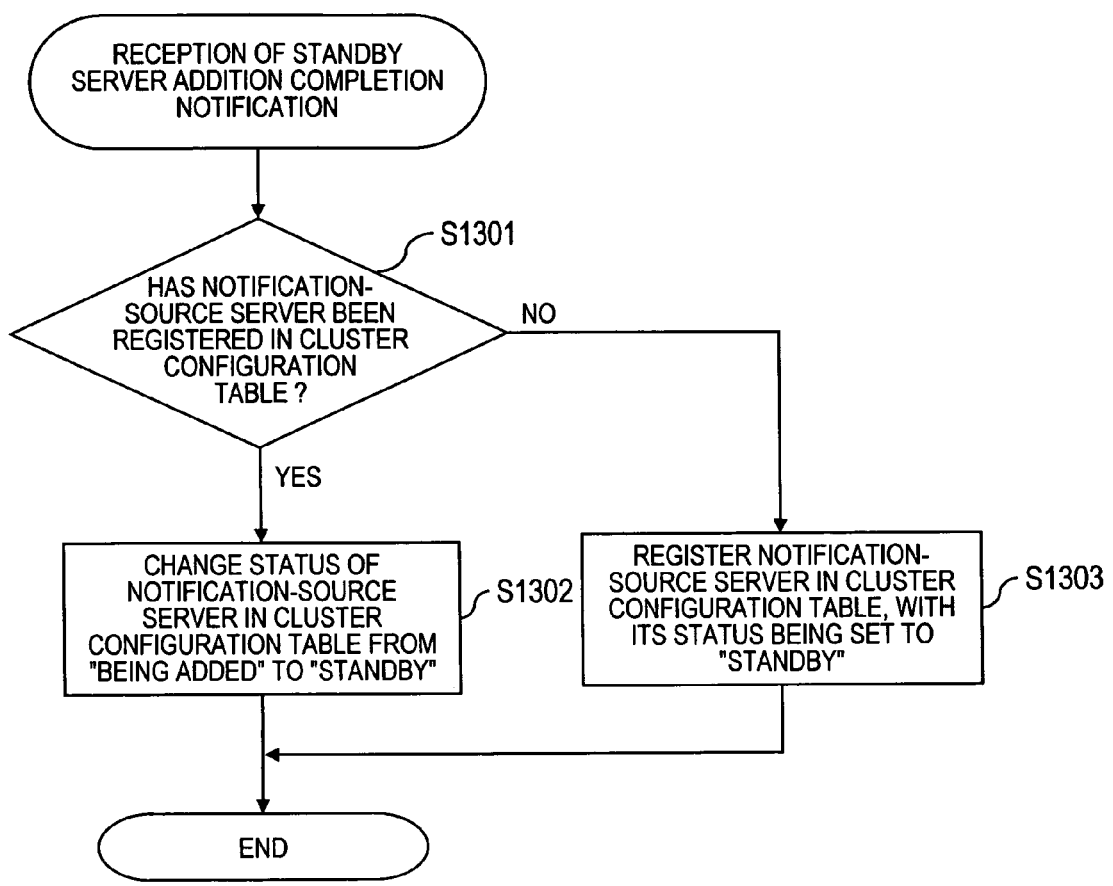
FIG. 13 is a flowchart showing a procedure of processing performed in the active server and the standby server when the cluster configuration management module receives a standby server addition completion notification in accordance with the first embodiment of this invention.

FIG. 13 is a flowchart showing a procedure of processing performed in the active server 100 and the standby server when the cluster configuration management module receives a standby server addition completion notification, in the first embodiment of this invention.

The CPU 101 of the active server 100 first determines whether the notification source server that has transmitted the standby server addition completion notification has already been registered with the status of "being added", in the cluster configuration table (S1301). When the notification source server has already been registered ("Yes" in S1301), the CPU 101 of the active server 100 changes the status of the notification source server from "being added" to "standby" in the cluster configuration table (S1302). When the notification source server has not been registered ("No" in S1301), the CPU 101 of the active server 100 newly registers the notification source server in the cluster configuration table, with its status being set to "standby" (S1303).

As described above, through the processings described with reference to FIG. 3 to FIG. 13, it is possible to add a new server as a standby server and to recover the data redundancy, without stopping the active server.

It should be noted that although a log is used as update information to be transferred from the active server to the standby server in the first embodiment of this invention, information may be transferred which is required to apply data updated in the active server to the standby server. For example, the update data itself may be transferred.

Further, the data to be transferred may be divided and transmitted in a plurality of times of transmission, instead of being transmitted at one time. For example, a method may be used in which a notification indicating that data has been updated is just transmitted to the standby server, and the standby server inquires the active server about update information.

Further, although the network is used as an example of a transfer path, another transfer path may be used as long as it can be used for communication between a plurality of computers. For example, a volume replication function of a storage device or direct memory access (DMA) may be used. Further, when a plurality of transfer methods can be selected, the methods may be used in combination. For example, different transfer methods may be used to transfer database from the standby server and to transfer an update log from the active server.

Further, when a checkpoint dump or a snapshot, which is used for periodically storing data in a storage device such as a disk drive, is implemented in advance, another transfer method may be used in which the stored data is read by an additional computer which is a transfer destination of the data and data different from the stored data is transferred from a transfer-source computer.

According to the first embodiment of this invention, because the database of the standby server is replicated, a new server can be added as a standby server without stopping the active server.

Further, according to the first embodiment of this invention, even when the database transmission source standby server receives a database transmission request from an added standby server during the log applying processing, the log applying processing of the database transmission source standby server is stopped and restarted after replication of the database is completed. As a result, data stored in the active server, the database transmission source standby server, and the added standby server can be synchronized.

Second Embodiment

In the first embodiment of this invention, the description has been given of the procedure to add the standby server 400 to the computer system that includes the active server 100 and one standby server 200. In the second embodiment of this invention, a description will be given of a procedure to newly add the standby server 400 to a cluster in which the databases of two standby servers, the standby server 200 and the standby server 300, are synchronized with the database 121 of the active server 100, and to synchronize the database 421 of the standby server 400 with the database 121 of the active server 100.

It should be noted that, in the second embodiment of this invention, descriptions of contents common to the first embodiment of this invention are omitted where appropriate.

In first embodiment of this invention, because only the standby server 200 is synchronized with the active server 100, the standby server 200, which is the only standby server, is selected as a database transmission source standby server in the database transmission source standby server determination processing (S905 and S1002) performed by the cluster configuration management module 419 of the additional standby server 400. However, when there are a plurality of standby servers, it is necessary to determine which standby server is selected as a database transmission source standby server.

Figure 14A:
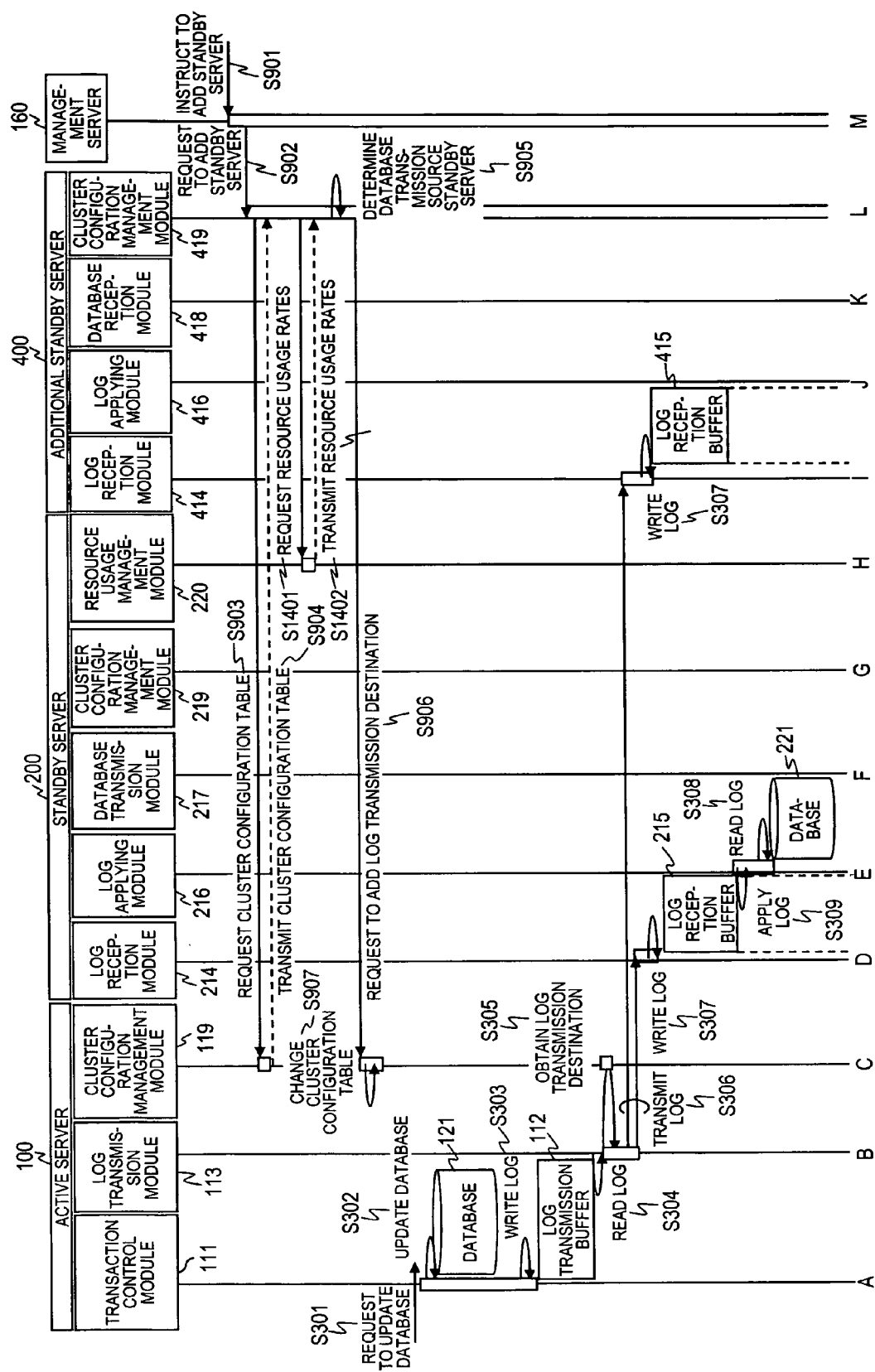
FIG. 14A and FIG. 14B are sequence diagrams showing processing of adding a standby server to a computer system in accordance with a second embodiment of this invention.
Figure 14B:
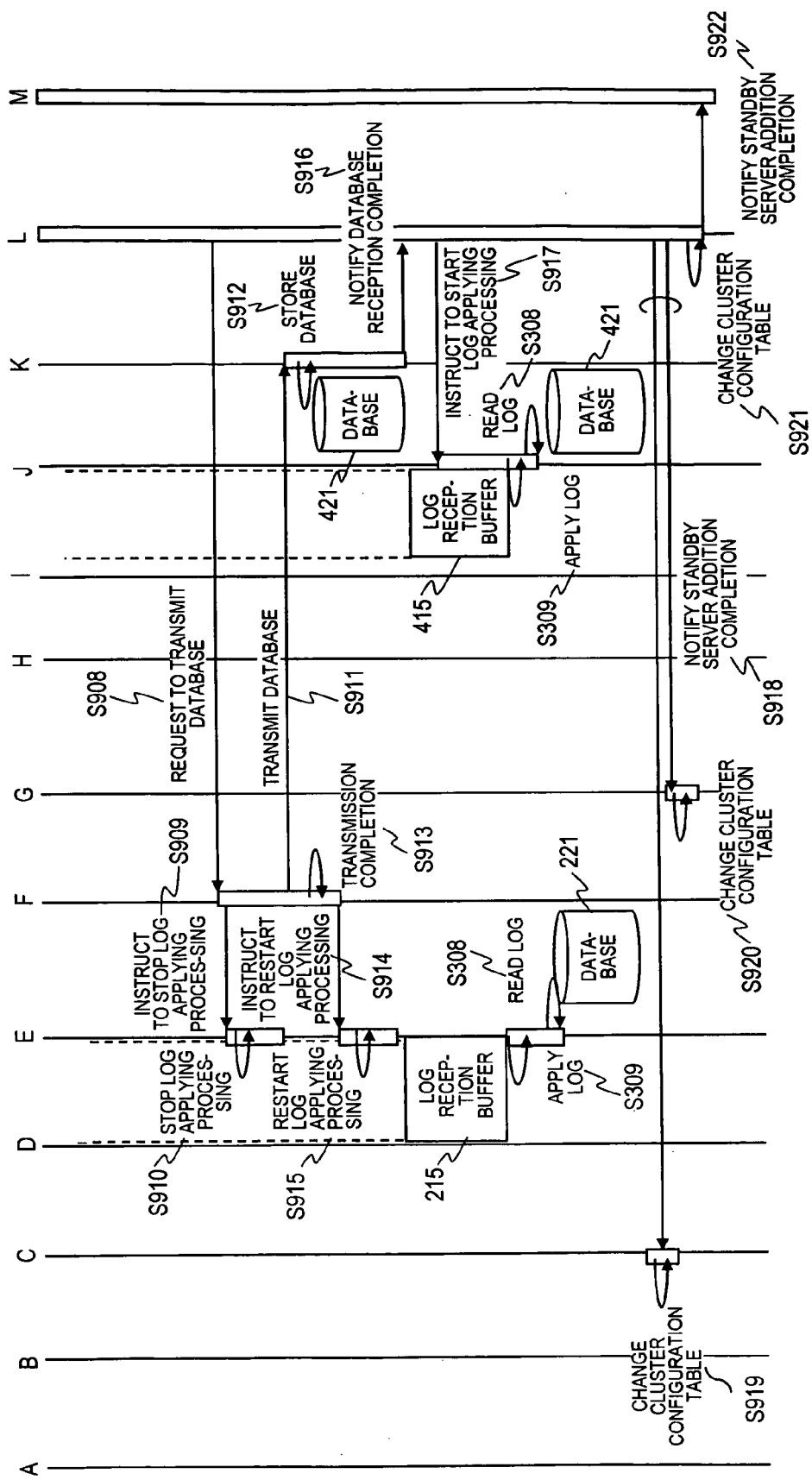

FIG. 14A and FIG. 14B are sequence diagrams showing processing of adding a standby server to a computer system according to the second embodiment of this invention.

In the second embodiment of this invention, the active server 100, the standby server 200, and the standby server 300, are synchronized, the standby server 400 is added and the database of the standby server 400 is synchronized with the databases when the databases of three computers. FIG. 14A and FIG. 14B corresponds to FIG. 9A and FIG. 9B, referenced in the first embodiment of this invention. In FIG. 14A, steps having reference symbols S301 to S309 and S901 to S922 are identical to those shown in FIG. 9A and FIG. 9B. It should be noted that FIG. 14A and FIG. 14B does not show the standby server 300 because the standby server 200 and the standby server 300 perform the same processing.

When the cluster configuration table is received from the active server 100 (S904), the cluster configuration management module 419 of the additional standby server 400 transmits a resource usage rate transmission request to the resource usage monitoring modules of all standby servers which are included in the cluster configuration table and whose statuses are set to "standby" (S1401). Specifically, the resource usage rate transmission request is transmitted to the resource usage monitoring module 220 of the standby server 200 and to the resource usage monitoring module 320 of the standby server 300.

The resource usage monitoring module 220 of the standby server 200 monitors a CPU usage rate, a memory usage rate, and a network bandwidth usage rate of the standby server 200. When the resource usage rate transmission request is received, the resource usage monitoring module 220 transmits the CPU usage rate, the memory usage rate, and the network bandwidth usage rate to the request source (S1402). The resource usage monitoring module 320 of the standby server 300 operates in a similar manner.

When the resource usage rates are received from the standby servers, the cluster configuration management module 419 of the additional standby server 400 compares the resource usage rates of the standby servers and selects the standby server having the lowest resource usage rate, as a database transmission source standby server (S1403).

Steps performed after the selection of the database transmission source standby server are the same as those shown in FIG. 9A and FIG. 9B, performed in the first embodiment of this invention.

Figures 15, 16:
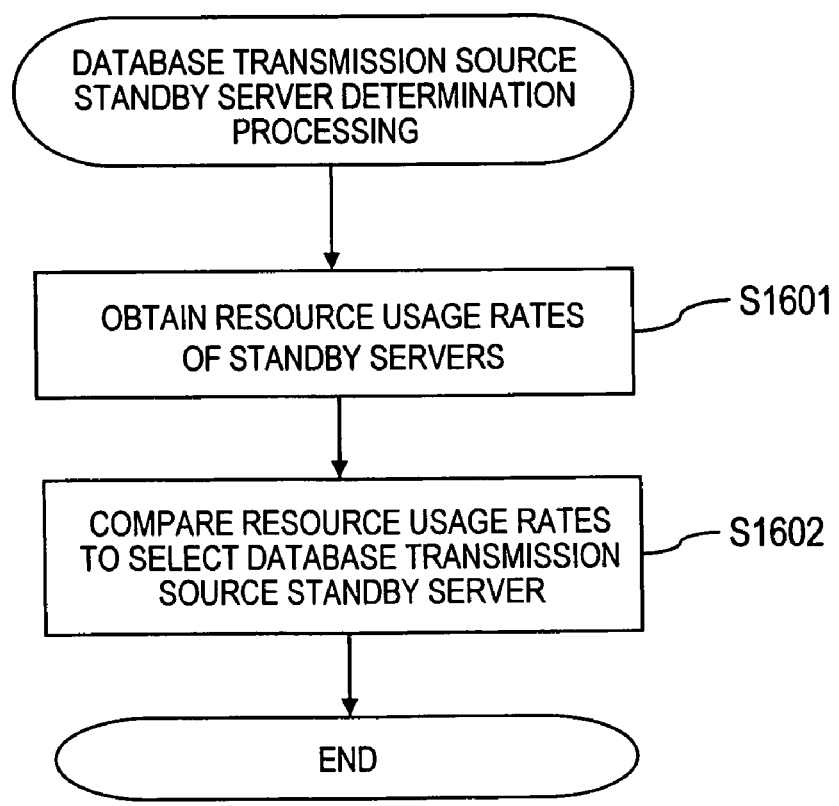
FIG. 15 is a diagram showing an example of a resource usage comparison table used for the database transmission source standby server determination processing in accordance with the second embodiment of this invention.
FIG. 16 is a flowchart showing a procedure of the database transmission source standby server determination processing of the cluster configuration management module of the additional standby server in accordance with the second embodiment of this invention.

FIG. 15 is a diagram showing an example of a resource usage comparison table used for the database transmission source standby server determination processing according to the second embodiment of this invention.

The resource usage comparison table holds, for each standby server, a server name, a CPU usage rate, a memory usage rate, and a network usage rate. It should be noted that when there are a plurality of resources, such as CPUs or networks, which can be used by each standby server, the usage rate may be held for each of the resources.

FIG. 16 is a flowchart showing a procedure of the database transmission source standby server determination processing (S1002) of the cluster configuration management module 419 of the additional standby server 400, according to the second embodiment of this invention.

The CPU 101 of the additional standby server 400 transmits a resource usage rate transmission request to all the standby servers which are included in the cluster configuration table and whose statuses are set to "standby", and obtains the resource usage rates from the standby servers (S1601). Further, the CPU 101 of the additional standby server 400 generates the resource usage comparison table shown in FIG. 15, based on the obtained resource usage rates of the standby servers.

Next, the CPU 101 of the additional standby server 400 compares the CPU usage rates, the memory usage rates, and the network bandwidth usage rates of the standby servers included in the resource usage comparison table, and selects the standby server having the lowest resource usage, as a database transmission source standby server (S1602).

To compare the resource usage, an evaluation value is calculated based on each resource usage rate obtained from each standby server. Then, the server having the lowest resource usage is selected. As an example comparison method, the resource usage is compared by using the following evaluation formula, and the standby server having the largest value is selected as a database transmission source standby server.

$$(1-\text{CPU usage rate}) \times (1-\text{memory usage rate}) \times (1-\text{network bandwidth usage rate})$$

Alternatively, another comparison method may be used in which the standby server having the lowest CPU usage rate is simply selected, or in which the standby server having the lowest memory usage rate or the lowest network bandwidth usage rate is selected.

In the second embodiment of this invention, the CPU, the memory, and the network are taken as resource examples, but other hardware elements used in each server may be used. Further, in the second embodiment of this invention, the usage rate is used as information indicating the resource usage, but an index indicating directly or indirectly the resource usage may be used.

According to the second embodiment of this invention, in addition to the effect described in the first embodiment, since the database is transferred from the standby server having the lowest resource usage rate to the additional standby server, the new standby server can be promptly added.

Third Embodiment

In a third embodiment of this invention, as in the first embodiment of this invention, when the database 221 of the standby server 200 and the database 121 of the active server 100 are synchronized, the standby server 400 is newly added to the cluster and the database 421 of the standby server 400 is synchronized with the databases of the active server 100 and the standby server 200.

In the first embodiment of this invention, the additional standby server 400 obtains a log only from the active server 100. The third embodiment of this invention is different from the first embodiment in that the additional standby server 400 obtains a log also from the standby server 200.

Figure 17A:
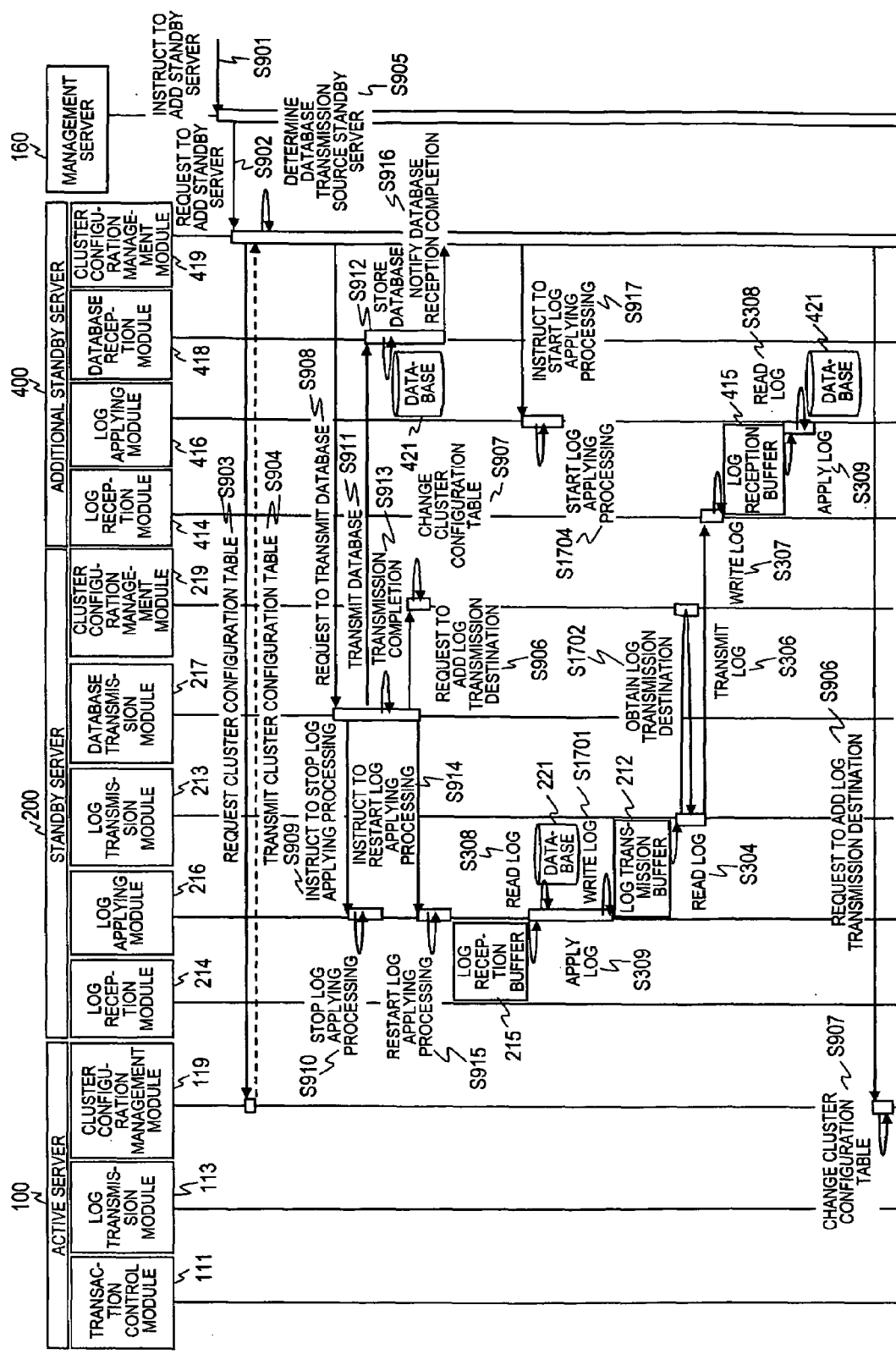
FIG. 17A and FIG. 17B are sequence diagrams showing processing of adding a standby server to a computer system in accordance with a third embodiment of this invention.
Figure 17B:
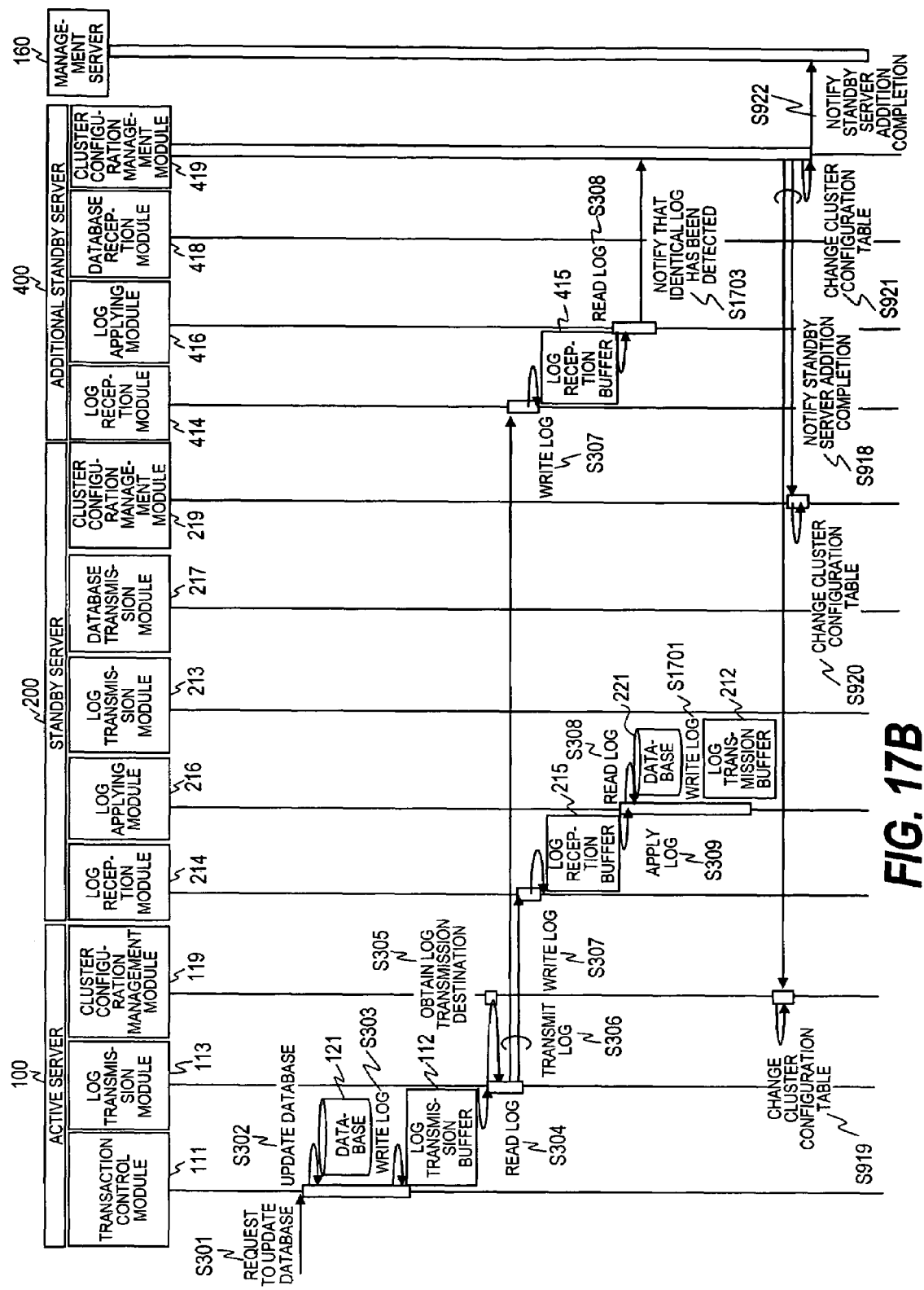

FIG. 17A and FIG. 17B are sequence diagrams showing processing of adding a standby server to a computer system according to the third embodiment of this invention.

In the third embodiment of this invention, the standby server 400 is newly added when the databases of the two computers, the active server 100 and the standby server 200, are synchronized, and the database of the standby server 400 is synchronized with the databases of the active server 100 and the standby server 200. FIG. 17A and FIG. 17B correspond to FIG. 9A and FIG. 9B, referenced in the first embodiment of this invention. In FIG. 17A and FIG. 17B, steps having reference symbols S301 to S309 and S901 to S922 are identical to those shown in FIG. 9A and FIG. 9B.

Hereinafter, steps different from those in the first embodiment of this invention will be mainly described.

The processings performed from the step S901, in which the cluster administrator uses the management server 160 to instruct to add the standby server, to the step S905, in which the cluster configuration management module 419 of the additional standby server 400 determines a database transmission source standby server, are the same as those of FIG. 9A.

The cluster configuration management module 419 of the additional standby server 400 transmits a database transmission request to the database transmission source standby server 200 (S908). The steps S909 to S913 are the same as those of FIG. 9B.

When the database transmission is completed (S913), the database transmission module 217 of the database transmission source standby server 200 requests the cluster configuration management module 219 to add a log transmission destination (S906). The cluster configuration management module 219 adds an entry of the additional standby server 400 to the cluster configuration table (S907). The entry contains the server name and the IP address of the additional standby server 400 and the status of "being added". Then, the database transmission module 217 instructs the log applying module 216 to restart log applying processing (S914).

When the instruction to restart log applying processing is received, the log applying module 216 of the database transmission source standby server 200 performs log applying restart processing (S915). In the log applying restart processing, the log applying module 216 applies a log to the database 221 and also writes the log to a log transmission buffer 212 (S1701).

A log transmission module 213 of the database transmission source standby server 200 reads the log from the log transmission buffer 212 (S304) and then obtains a log transmission destination from the cluster configuration management module 219 (S1702). At this time, the log transmission module 213 obtains only a server whose status is set to "being added" as a log transmission destination. The log transmission module 213 transmits the log to the additional standby server 400, which is the log transmission destination (S306). The steps S307 to S309 performed in the additional standby server 400 which has received the transmitted log are the same as those of FIG. 9A and FIG. 9B.

When the database is updated from the step S910, in which the log applying processing is stopped, to the step S915, in which the log applying processing is restarted, a log received by the standby server 200 is held in the log reception buffer 215 in the standby server 200.

The steps S912 and S916 performed in the additional standby server 400 when the database is received are the same as those of FIG. 9B. When a database reception completion notification is received, the cluster configuration management module 419 of the additional standby server 400 instructs the log applying module 416 to start log applying processing (S917), and the log applying module 416 log applies received log (S1704). Then the cluster configuration management module 419 transmits a log transmission destination addition request to the active server 100 (S906). The step S907 performed in the active server 100 is the same as that of FIG. 9A.

Therefore, after the step S907 performed in the active server 100, when a request to update the database is transmitted from the client 150 (S301), the database is updated and a log is transmitted also to the additional standby server 400 (S302 to S307).

When a received log is read and applied to the database, the log applying module 416 of the additional standby server 400 can detect whether the received log is identical to a log that has been applied, by comparing the commit sequence number of the log with the commit sequence number of the database 421. When it is detected that an identical log has been received, the log applying module 416 notifies the reception of an identical log to the cluster configuration management module 419 (S 1703). When the reception of an identical log is notified, the cluster configuration management module 419 transmits a standby server addition completion notification to the cluster configuration management module 119 of the active server 100 and the cluster configuration management module 219 of the standby server 200 (S918). The subsequent steps S919 to S922 are the same as those of FIG. 9B.

Figure 18:
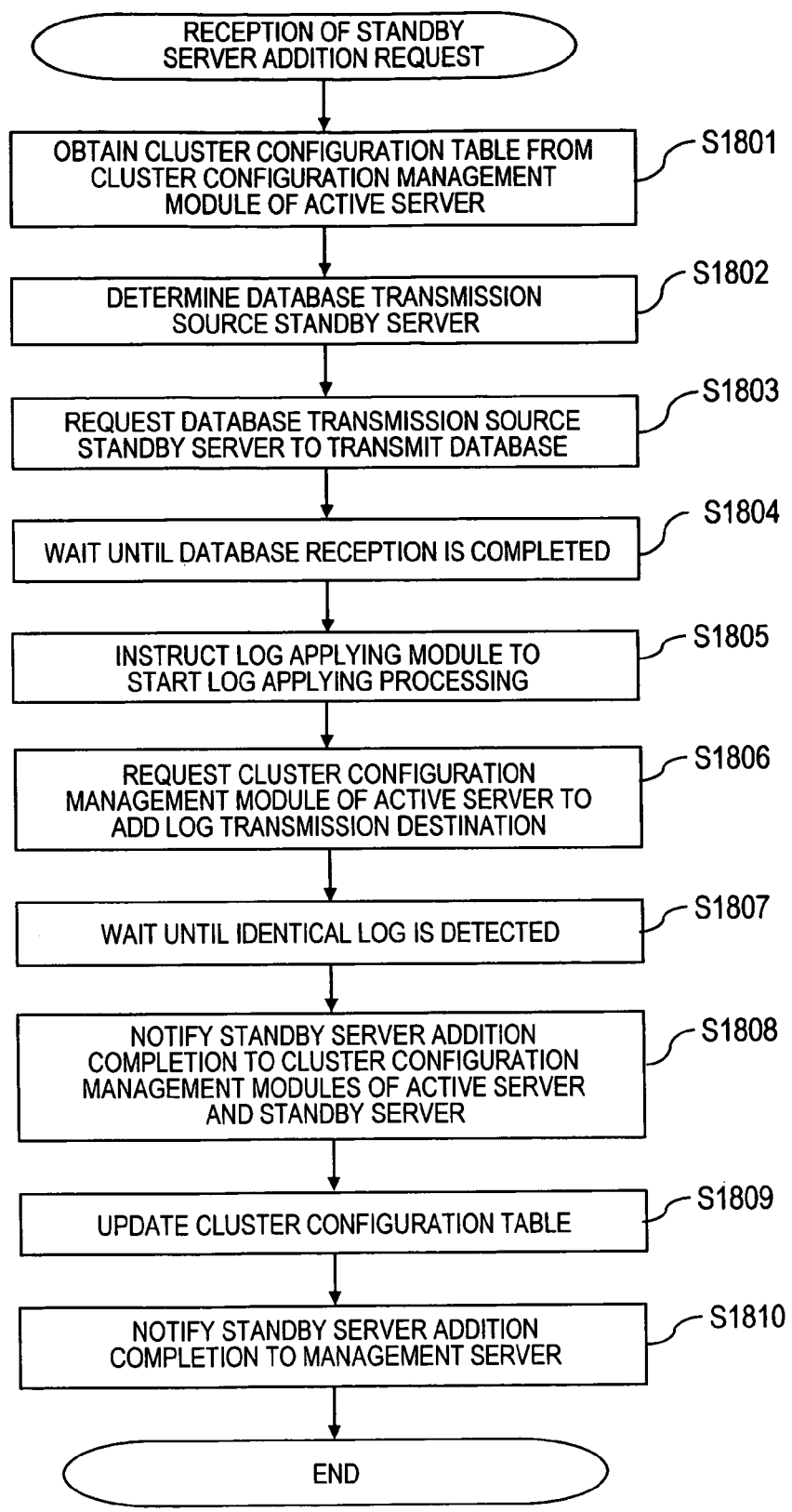
FIG. 18 is a flowchart showing a procedure of the standby server addition processing of the cluster configuration management module of the additional standby server in accordance with the third embodiment of this invention.

FIG. 18 is a flowchart showing a procedure of the standby server addition processing of the cluster configuration management module 419 of the additional standby server 400, according to the third embodiment of this invention.

When a standby server addition request is received, the CPU 101 of the additional standby server 400 requests the active server 100 to transmit the cluster configuration table and obtains the cluster configuration table (S1801 corresponding to S903 and S904 of FIG. 17A). Next, the CPU 101 of the additional standby server 400 determines a standby server that serves as the database transmission source, based on information of the obtained cluster configuration table (S1802 corresponding to S905 of FIG. 17A). It should be noted that the steps S1801 and S1802 are the same as the steps S1001 and S1002 of FIG. 10.

The CPU 101 of the additional standby server 400 transmits a database transmission request to the database transmission module 217 of the database transmission source standby server 200, determined in the step S1802 (S1803 corresponding to S908 of FIG. 17A). Next, the CPU 101 of the additional standby server 400 waits until reception of the database is completed in the database reception module 418 (S1804).

When the reception of the database is completed, the CPU 101 of the additional standby server 400 instructs the log applying module 416 to start log applying processing (S1805 corresponding to S917 of FIG. 17A). Next, the CPU 101 of the additional standby server 400 transmits a log transmission destination addition request to the cluster configuration management module 119 of the active server 100 (S1806). Thereafter, the CPU 101 of the additional standby server 400 waits until the log applying module 416 detects that an identical log has been received (S1807 corresponding to S1703 of FIG. 17B).

The CPU 101 of the additional standby server 400 transmits a standby server addition completion notification to the cluster configuration management modules of the active server 100 and each of the standby server 200 (S1808 corresponding to S918 of FIG. 17B). Further, the CPU 101 of the additional standby server 400 adds an entry of the additional standby server 400 to the cluster configuration table held in the cluster configuration management module 419 (S1809 corresponding to S921 of FIG. 17B). The entry contains the server name and the IP address of the additional standby server 400 and the status of "standby". Then, the CPU 101 of the additional standby server 400 notifies the standby server addition completion to the management server 160 (S1810 corresponding to S922 of FIG. 17B). It should be noted that the steps S1808 to S1810 are the same as the steps S1007 to S1009 of FIG. 10.

As described above, according to the third embodiment of this invention, even when the active server 100 updates the database 121 according to a database update request, if the database 221 of the standby server 200 is replicated and the log is transferred from the standby server 200 and applied, the database 421 of the additional standby server 400 can be synchronized with the database 121 of the active server 100.

Further, when the third embodiment of this invention and the database transmission source standby server determination method described in the second embodiment of this invention are combined, the third embodiment of this invention can also be applied to a case where there are a plurality of standby servers.

According to the third embodiment of this invention, the number of logs that need to be temporarily held in the log reception buffer 415 of the additional standby server 400 can be reduced compared to the first embodiment of this invention. It should be noted that because the database transmission source standby server 200 needs to transmit a log, the resource usage of the source standby server 200 increases.

Fourth Embodiment

In the first embodiment of this invention, database data is transferred through the network. In a fourth embodiment of this invention, when the network bandwidth is sufficient, database data is transferred through the network. However, when the network bandwidth is insufficient, database data is transferred through a storage shared by the database transmission source standby server and the additional standby server.

Figure 19:
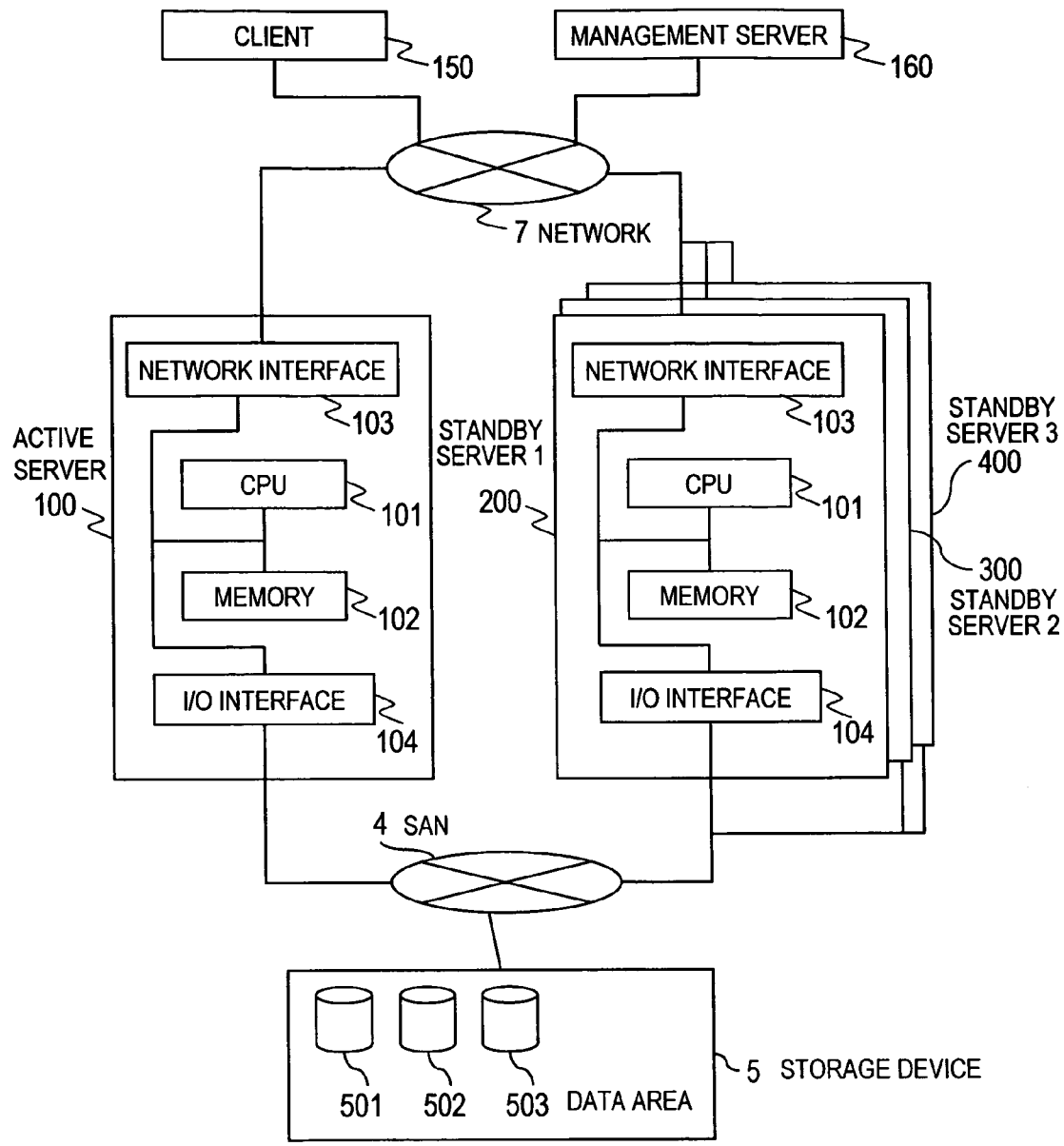
FIG. 19 is a block diagram showing a hardware configuration of a computer system in accordance with a fourth embodiment of this invention.

FIG. 19 is a block diagram showing a hardware configuration of a computer system according to the fourth embodiment of this invention.

Hereinafter, differences from the hardware configuration of the computer system shown in FIG. 1 of the first embodiment of this invention will be mainly described.

The active server 100 includes an I/O interface (host bus adapter) 104 used to access a storage device 5 through a storage area network (SAN) 4. The standby servers 200, 300, and 400 also have the same configuration as the active server 100.

The storage device 5 has a plurality of disk drives, and areas (volumes) 501 to 503 are specified as storage areas that can be accessed by the active server 100 and the standby servers 200, 300, and 400.

Figure 20:
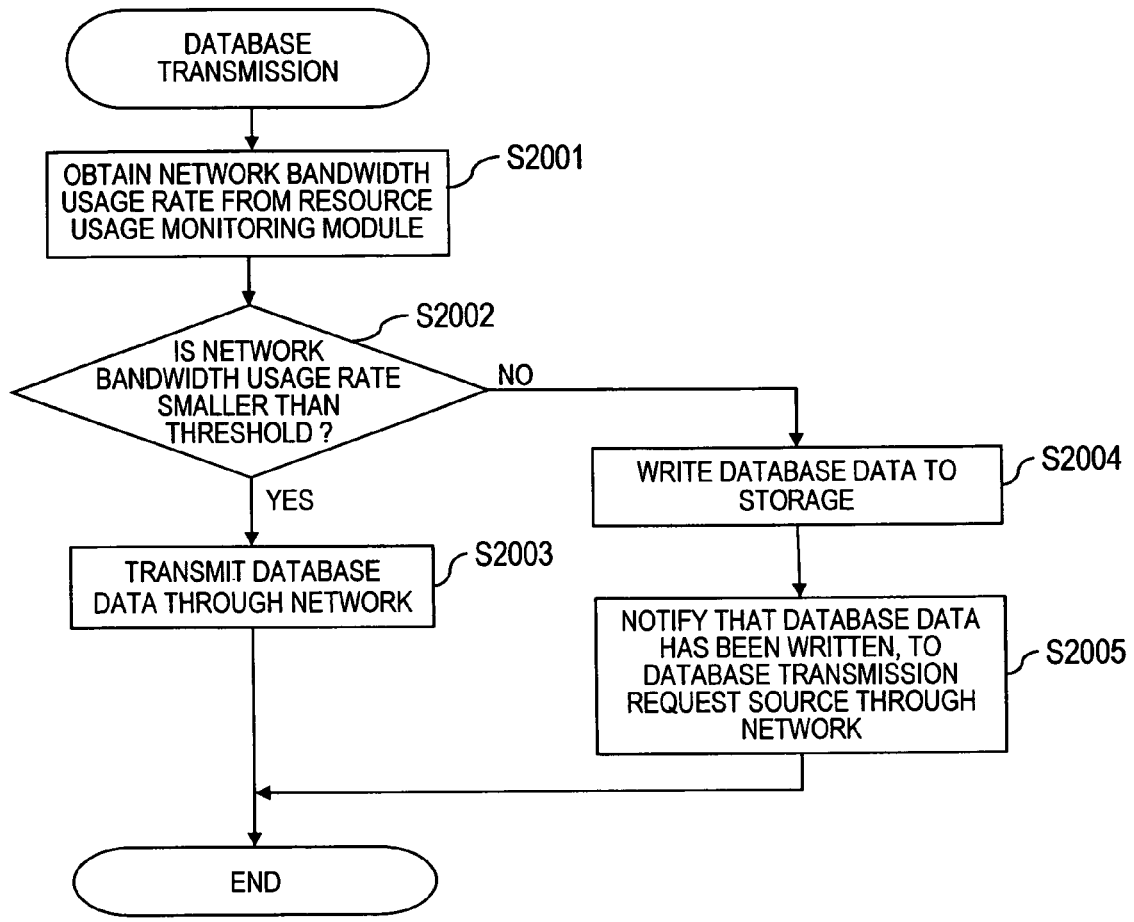
FIG. 20 is a flowchart showing a procedure of processing of the database transmission module of the database transmission source standby server in accordance with a fourth embodiment of this invention.

FIG. 20 is a flowchart showing a procedure of processing of the database transmission module 217 of the database transmission source standby server 200, according to the fourth embodiment of this invention.

The processing shown in FIG. 20 is performed instead of the step S1206 of FIG. 12, performed in the first embodiment of this invention.

When the database transmission module 217 receives a database transmission request, the CPU 101 of the database transmission source standby server 200 obtains the network bandwidth usage rate from the resource usage monitoring module 220 (S2001). Further, the CPU 101 of the database transmission source standby server 200 determines whether the obtained network bandwidth usage rate is smaller than a threshold (for example, 50%) specified in advance (S2002). When the network bandwidth usage rate is smaller than the threshold ("Yes" in S2002), the CPU 101 of the database transmission source standby server 200 transmits database data through the network 7 as in the first embodiment of this invention (S2003).

When the network bandwidth usage rate is equal to or larger than the threshold ("No" in S2002), the CPU 101 of the database transmission source standby server 200 writes database data to a volume of the storage device 5 (S2004). Further, the CPU 101 of the database transmission source standby server 200 transmits, through the network 7, a write completion notification containing the ID of the volume to which the database data has been written, to the server that has transmitted the database transmission request (S2005).

It should be noted that, although FIG. 20 shows an example case where the database transmission source standby server 200 performs the determination processing of the step S2002, another case may be adopted in which the additional standby server determines the transmission method based on a resource usage monitoring result and notifies the transmission method to the database transmission source standby server 200. Further, the determination processing of the step S2002 may be performed at the time of the processing of selecting the database transmission source standby server described in the second embodiment of this invention. In this case, the step S2002 may be performed as a part of the selection processing, and the additional standby server can be added with the network being preferentially used for database transfer.

Figure 21:
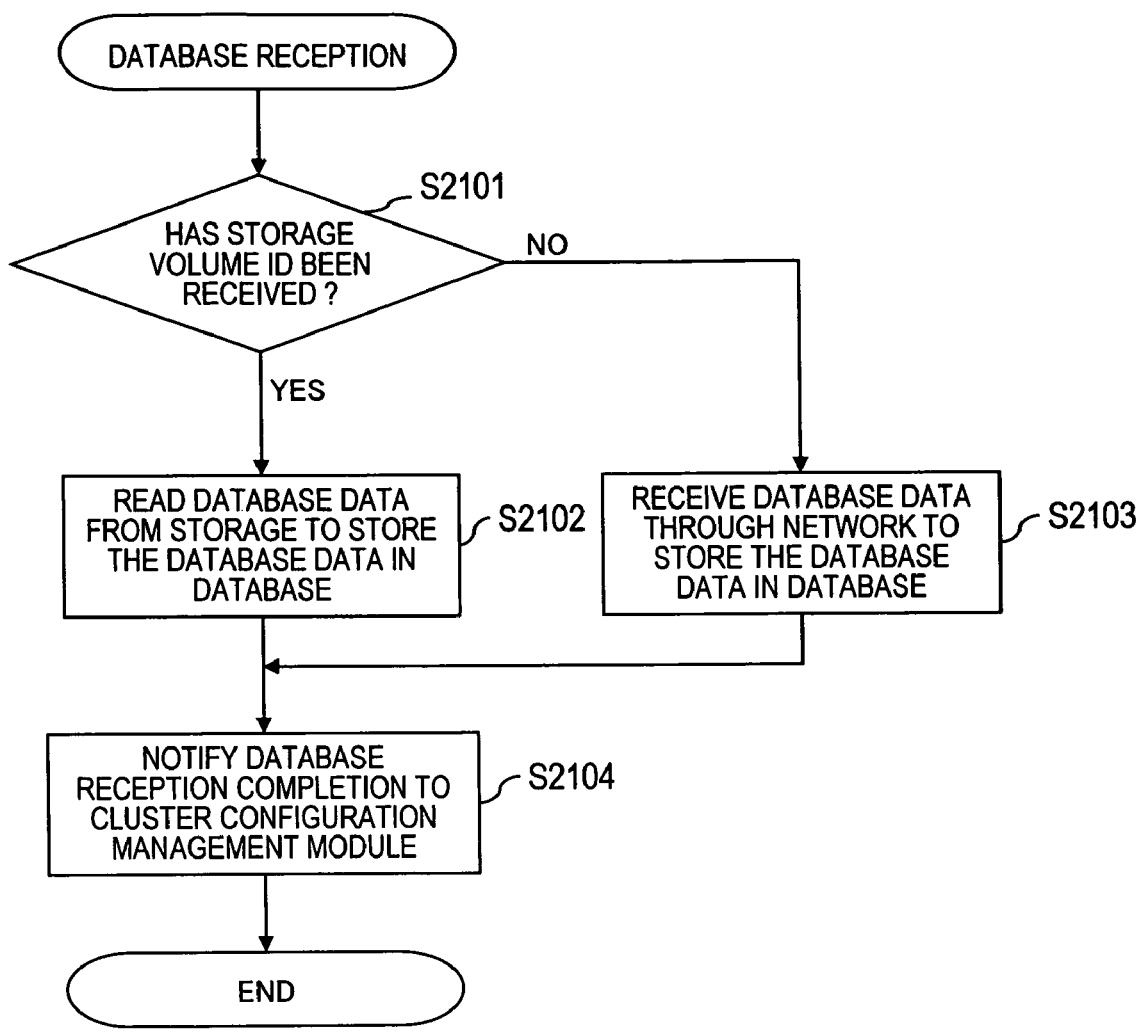
FIG. 21 is a flowchart showing a procedure of processing of the database reception module of the additional standby server in accordance with the fourth embodiment of this invention.

FIG. 21 is a flowchart showing a procedure of processing of the database reception module 418 of the additional standby server 400 according to the fourth embodiment of this invention.

The processing shown in FIG. 21 is performed instead of the steps S912 and S916 of FIG. 9B, performed in the first embodiment of this invention.

The CPU 101 of the additional standby server 400 determines whether a storage volume ID which identifies a data area of the storage device 5 has been received, instead of database data, from the database transmission module 217 of the database transmission source standby server 200 (S2101).

When a storage volume ID has been received ("Yes" in S2101), the CPU 101 of the additional standby server 400 reads database data from the volume which is the identified data area to store the database data in the database 421 (S2102). On the other hand, when database data has been received ("No" in S2101), the CPU 101 of the additional standby server 400 stores the received database data in the database 421 (S2103 corresponding to S912 of FIG. 9B). In any case, when the storage of the database data is completed, the CPU 101 of the additional standby server 400 notifies database reception completion to the cluster configuration management module 419 (S2104 corresponding to S916 of FIG. 9B).

As described above, in the fourth embodiment of this invention, it is possible to transfer database data through the network when the network bandwidth is sufficient and to transfer database data by using the storage shared by the database transmission source standby server and the additional standby server when the network bandwidth is insufficient. The fourth embodiment of this invention shows the example to select the network or the storage through which database data is to be transferred, however, the transfer path may be changed. The transfer path selection method may be used not only for the database data transfer but also for the update log transfer.

According to the fourth embodiment of this invention, when data transfer may influence the log transfer processing or other processings using the transfer path, it is possible to avoid this influence and add the new standby server to the database system without affecting the performance thereof.

Fifth Embodiment

In a fifth embodiment of this invention, a new standby server is added to a database system when a virtualization function of a virtualization unit and a resource usage control function of a virtual server are available.

Figure 22:
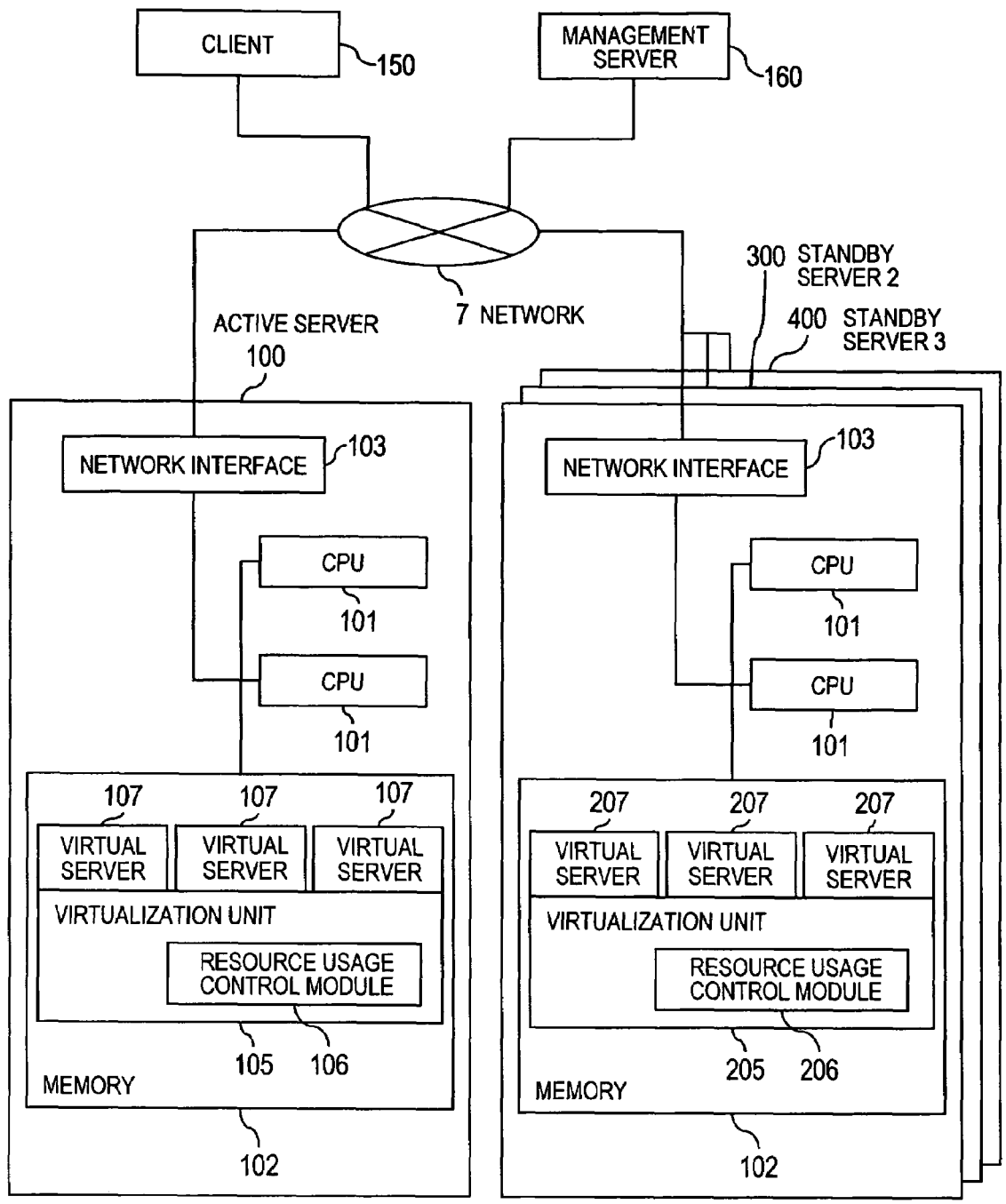
FIG. 22 is a block diagram showing a hardware configuration of a computer system in accordance with a fifth embodiment of this invention.
Figure 24A:
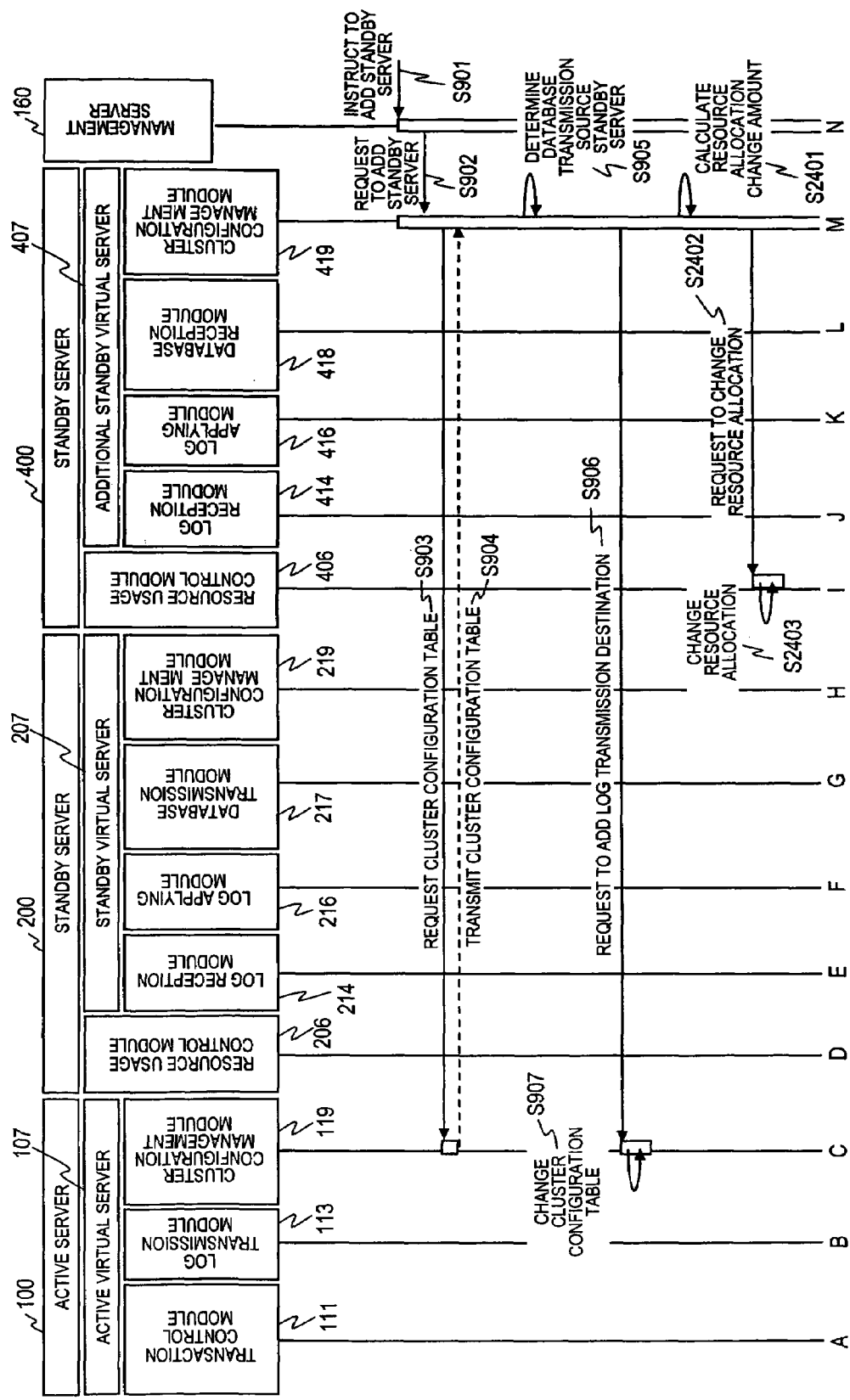
FIG. 24A to FIG. 24D are sequence diagrams showing processing of adding a standby server to the computer system in accordance with the fifth embodiment of this invention.
Figure 24B:
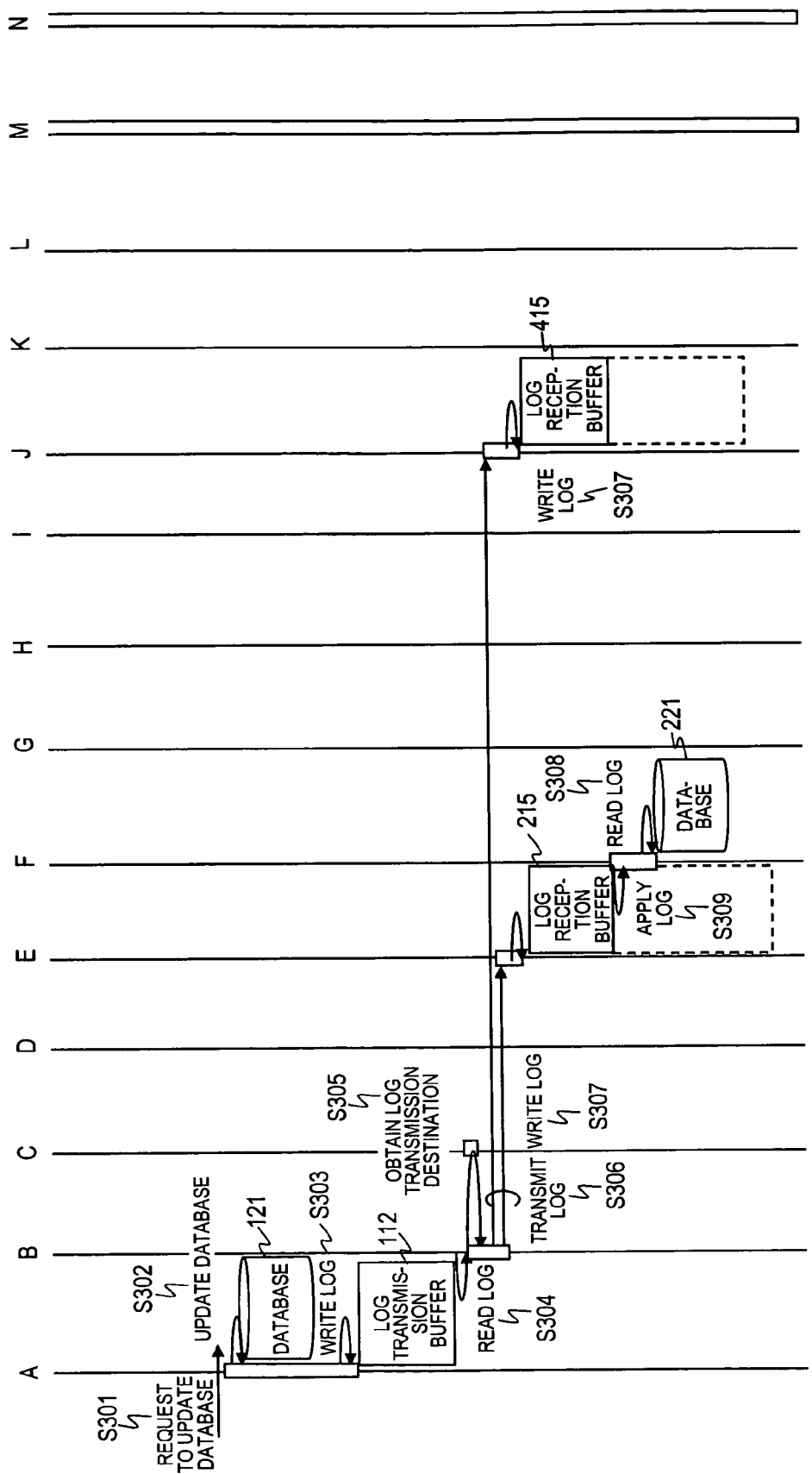
Figure 24C:
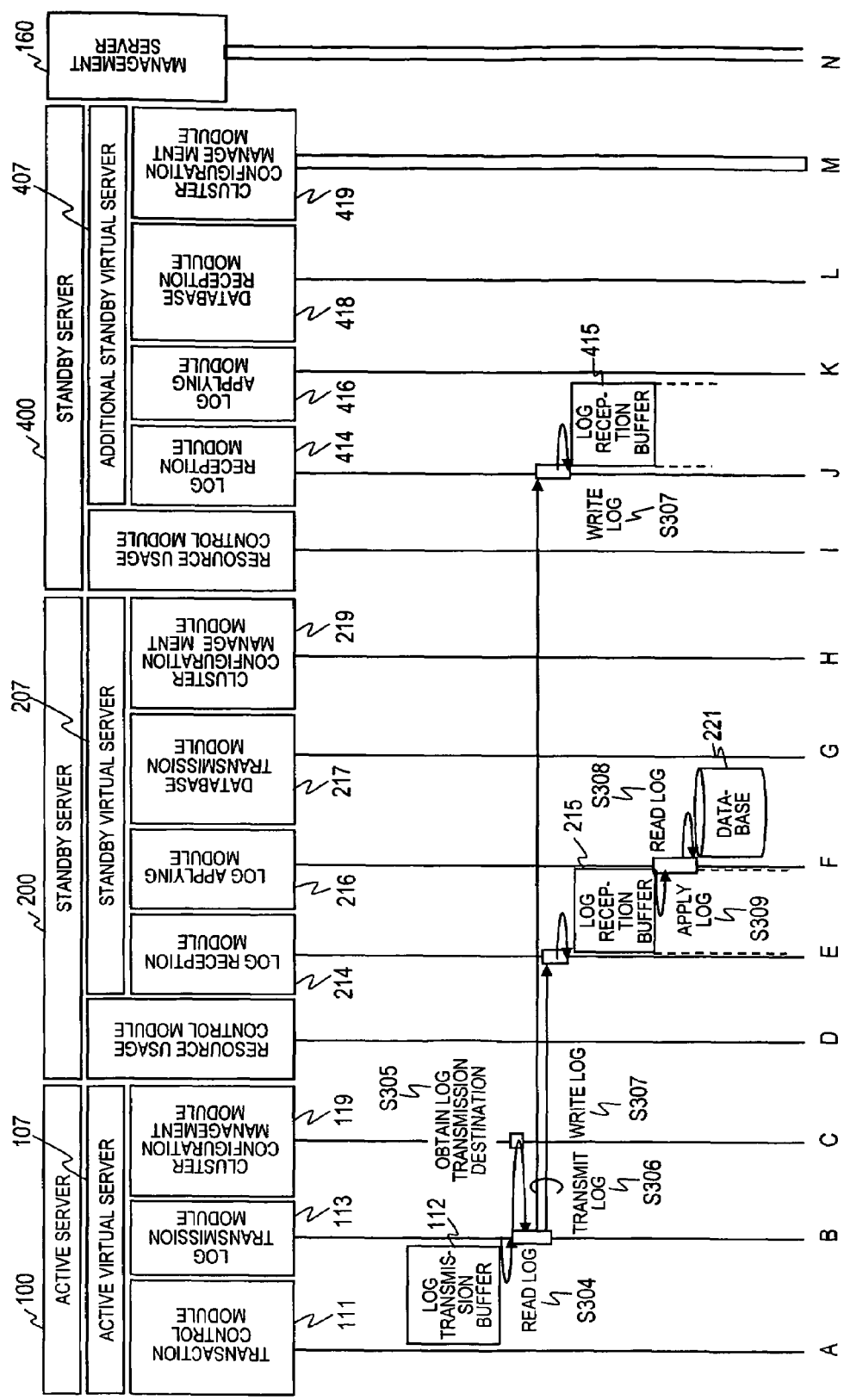
Figure 24D:
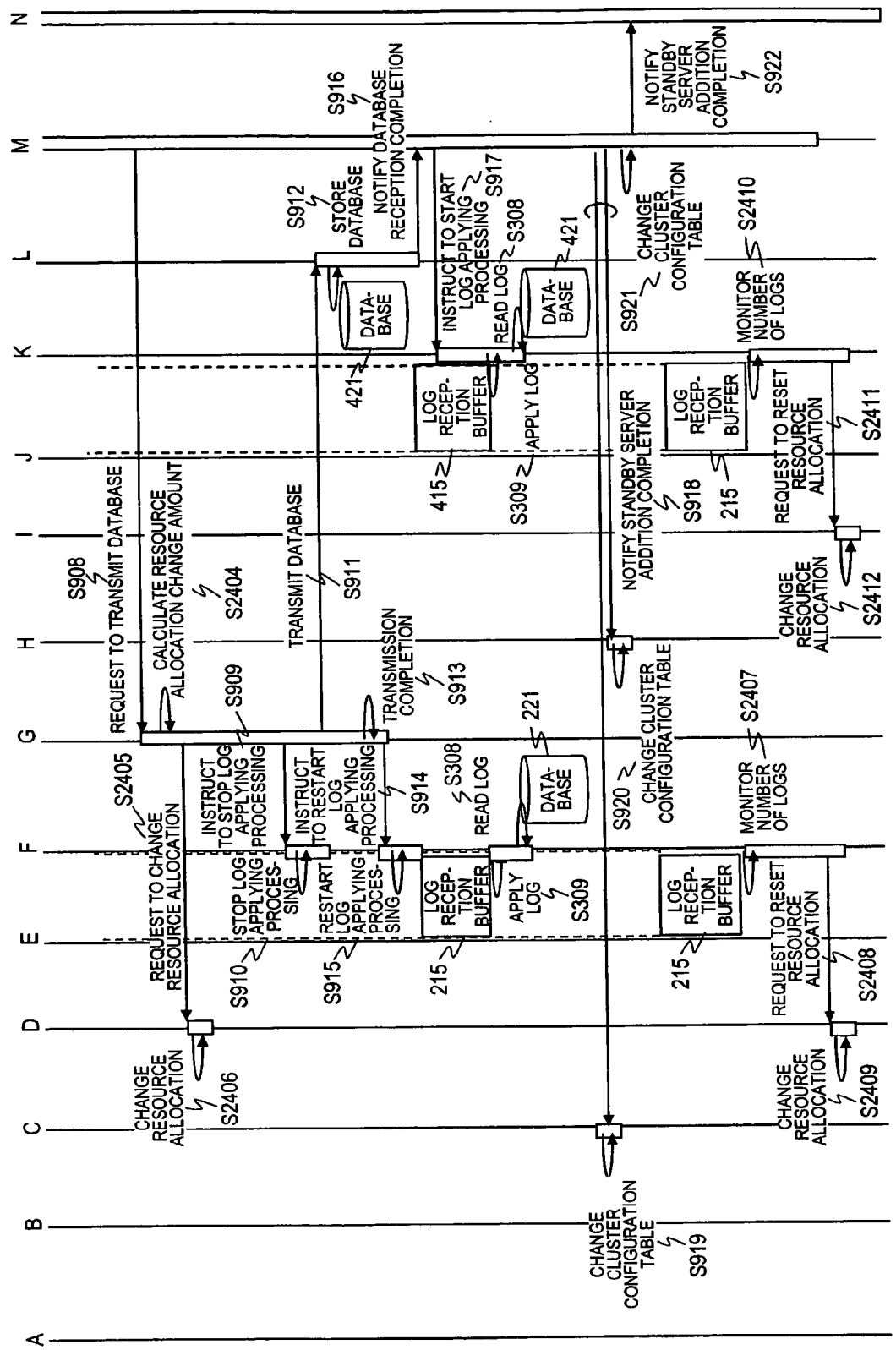

FIG. 22 is a block diagram showing a hardware configuration of a computer system according to the fifth embodiment of this invention.

The difference from the hardware configuration shown in FIG. 1 of the first embodiment of this invention is that a virtualization unit 105 is stored in the memory 102 of the active server 100 and, when the virtualization unit 105 is executed, virtual servers 107 are created.

When the virtualization unit 105 partitions the resources, such as the memory 102, the CPU 101, and the network interface 103 of the computer, and allocates the resources to the virtual servers 107 each, the virtual servers 107 have functions equivalent to those of a server. In each of the virtual servers 107, the functional blocks 111 to 121 operated in the active server 100, shown in FIG. 2, are operated as in an actual computer.

A resource usage control module 106 included in the virtualization unit 105 has a function of controlling, according to set values, the usage of resources such as the memory 102, the CPU 101, and the network interface 103 used by each virtual server 107. It should be noted that the set values can be externally specified. For example, the set values may be set from another server such as the management server 160 or from the virtual server which is a setting target.

The standby servers 200, 300, and 400 have the same configuration as the active server 100.

FIG. 23 is a diagram showing an example of a resource usage setting table held by the resource usage control module 106 according to the fifth embodiment of this invention.

The resource usage control module 106 controls the resource usage available for the virtual servers 107 based on the resource usage setting table. The resource usage setting table holds the virtual server names of the virtual servers 107 managed by the virtualization unit 105, and the upper limits of a CPU usage rate, a memory usage rate, and a network usage rate available for each of the virtual servers 107 with respect to the CPU 101, the memory 102, and the network interface 103 held by the server. Resources that are not allocated to any of the virtual servers are recorded in the resource usage setting table as unallocated resources. The upper limits of resource usage rates of each virtual server are set in advance by the system administrator through the management server 160. It should be noted that, when there are a plurality of resources, such as CPUs or networks, available for each virtual server, the upper limit can be held for each of the resources.

FIG. 24A to FIG. 24D are sequence diagrams showing processing of adding a standby server to the computer system according to the fifth embodiment of this invention.

In the fifth embodiment of this invention, in the case where the server virtualization function and the virtual server resource usage control function are available, when the databases of the computers of an active virtual server 107 and a standby virtual server 207 are synchronized, a standby virtual server 407 is newly added to be synchronized. FIG. 24A to FIG. 24D correspond to FIG. 9A and FIG. 9B, referred to in the first embodiment of this invention. In FIG. 24A to FIG. 24D, steps having reference symbols S301 to S309 and S901 to S922 are identical to those shown in FIG. 9A and FIG. 9B.

Hereinafter, processings different from those in the first embodiment of this invention will be mainly described.

In the fifth embodiment of this invention, when the cluster configuration management module 419 of the additional standby virtual server 407 transmits a log transmission destination addition request to the active virtual server 107 (S906), the cluster configuration management module 419 calculates a resource allocation change amount (S2401). Further, the cluster configuration management module 419 requests a resource usage control module 406 of the additional standby virtual server 407 to change the resource allocation (S2402). It should be noted that, in FIG. 24A, the step S2402, in which a resource allocation change request is issued, is performed after the step S906, in which a log transmission destination addition request is issued, but the step S2402 may be performed before the step S906, for example, because the resource allocation of the additional standby virtual server 407 is changed to allocate a resource used for log writing in the step S307 and log applying in the step S309. Alternatively, when the step S307 or S309 is performed, the log reception module 414 or the log applying module 416 of the additional standby virtual server 407 may perform the step S2402, in which a resource allocation change request is issued.

When the resource allocation change request, issued in the step S2402, is received, the resource usage control module 406 changes the upper limit of the resource usage of the additional standby virtual server 407 (S2403). Then, the cluster configuration management module 419 requests the database transmission source standby virtual server 207 to transmit the database (S908). When the database transmission request is received, the database transmission module 217 of the standby virtual server 207 calculates a resource allocation change amount (S2404) and requests the resource usage control module 206 of the standby virtual server 207 to change the resource allocation (S2405), before instructing the log applying module 216 to stop the log applying processing (S909).

When the resource allocation change request is received, the resource usage control module 206 changes the upper limit of the resource usage of the database transmission source standby virtual server 207 (S2406). It should be noted that, in FIG. 24D, the resource allocation change request, issued in the step S2405, is transmitted from the database transmission source standby virtual server 207, but the resource allocation change may be instructed by the management server 160 as in the step S2402, in which a resource allocation change request is issued, described above. In that case, as in the step S2402, the step S2405 may be performed before or after the step S908, in which a database transmission request is issued.

Then, after an instruction to restart log applying processing is received (S914), the log applying module 216 of the database transmission source standby server 207 sequentially applies logs stored in the log reception buffer 215 while the database was being transmitted (S911), to the database 221 (S308 and S309). At this time, the log applying module 216 monitors the number of logs stored in the log reception buffer 215 during the log applying processing (S2407). When the log applying module 216 detects that the number of logs has become equal to or lower than a certain number, for example, the number of logs at the time of the log applying processing stop instruction of the step S909, or that the number of logs has become zero, the log applying module 216 requests the resource usage control module 206 of the standby virtual server 207 to reset the resource allocation (S2408).

The step S2408, in which the resource allocation reset request is issued, may be performed by the management server 160 by notifying the detection result of a reduction in the number of logs to the management server 160, as in the step S2405, in which the resource allocation change request is issued. When the resource allocation reset request is received, the resource usage control module 206 resets the upper limit of the resource usage of the database transmission source standby virtual server 207, which has been changed in the step S2406, to the original value (S2409).

Similarly, in the additional standby virtual server 407, when reception of the database is completed (S916) and an instruction to start log applying processing is received (S917), the log applying module 416 sequentially applies logs stored in the log reception buffer 415 to the database 421 (S308 and S309). At this time, the log applying module 416 monitors the number of logs stored in the log reception buffer 415 during the log applying processing (S2410). When the log applying module 416 detects that the number of logs has become equal to or lower than a certain number, the log applying module 416 requests the resource usage control module 406 of the additional standby virtual server 407 to reset the resource allocation (S2411). When the resource allocation reset request is received, the resource usage control module 406 resets the upper limit of the resource usage of the additional standby virtual server 407, which has been changed in the step S2403, to the original value (S2412).

As described above, in the fifth embodiment of this invention, the virtualization unit increases the resource allocation of the virtual server in a period from when database data is transferred to when log applying processing for logs accumulated in the log reception buffer during the database data transfer processing, is completed. Therefore, database data can be promptly transferred and logs can be promptly applied. As a result, the time required to add the new standby virtual server to the database system can be reduced.

Figure 25:
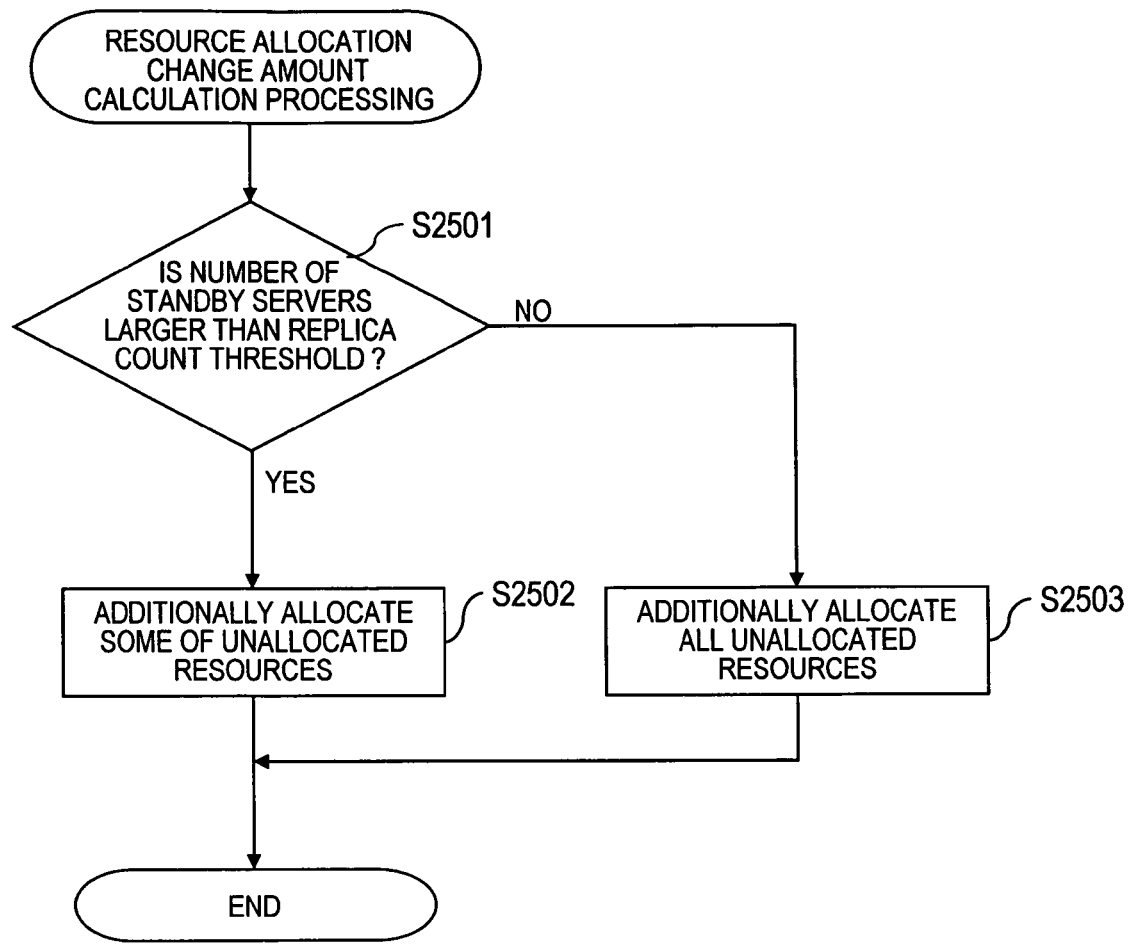
FIG. 25 is a flowchart showing a procedure of the resource allocation change amount calculation processing in accordance with the fifth embodiment of this invention.

FIG. 25 is a flowchart showing a procedure of the resource allocation change amount calculation processing (S2401 and S2404) according to the fifth embodiment of this invention.

First, the CPU 101 of the standby server refers to the cluster configuration table and calculates the number of servers whose statuses included in the cluster configuration table are set to "standby". Further, the CPU 101 of the standby server determines whether the number of servers whose statuses are set to "standby" is larger than a replica count threshold set in advance by the system administrator (S2501).

When the number of servers whose statuses are set to "standby" exceeds the replica count threshold ("Yes" in S2501), the CPU 101 of the standby server determines some of unallocated resources to be an additional resource allocation change amount (S2502). For example, half of unallocated resources are determined to be an additional resource allocation change amount. Alternatively, a fixed amount specified in advance by the system administrator is determined to be an additional resource allocation change amount.

When the number of servers whose statuses are set to "standby" does not exceed the replica count threshold ("No" in S2501), the CPU 101 of the standby server determines all unallocated resources to be an additional resource allocation change amount (S2503).

According to the fifth embodiment of this invention, addition of a standby virtual server can be promptly completed by increasing the resource allocation of the standby server to be added and the resource allocation of the standby server that provides a replica of the database. Particularly, in a case where the number of standby virtual servers is small and the level of redundancy of database data is low, when more resources are allocated, the level of redundancy of database data can be promptly recovered. It should be noted that as a threshold used to change the resource allocation in the additional standby server, a threshold set in the management server by the system administrator may be used in the additional standby server or a threshold directly set by the system administrator may be used.

The fifth embodiment of this invention shows an example case to increase the resource allocation of the standby server to be added and the resource allocation of the standby server that provides a replica of the database. However, when data transfer may influence the log transfer processing or other processings using the transfer path, the resource allocation may be reduced in order to avoid the influence.

This invention relates to a technique of guaranteeing data redundancy by adding a standby server while preventing data update performance from deteriorating, and is preferably applied to a data processing system in which data is frequently updated and high reliability is demanded. For example, this invention is preferably applied to information processing systems used in the financial field, for example, at securities companies and banks.

Further, because this invention handles processing of transferring data, this invention is preferably applied to systems which allow high-speed data transfer means, and more particularly to systems using blade servers, in which data can be transferred between servers through an internal bus.

In the embodiments of this invention, the descriptions have been given of the methods of adding the standby computer to the database system, for example. However, the applications of this invention are not limited to database systems. This invention can be applied to a system in which data stored in the active server is synchronized with data stored in the standby server.

In the embodiments of this invention, the descriptions have been given of the case where, among a plurality of computers, one of the computers is an active server that receives a database update request from the client and the others are standby servers that receive update information from the active server and apply the update information. However, this invention can be applied to a case where there are a plurality of active servers. For example, when each of the computers has processing modules for both the active server and the standby server, it is possible to transfer update information between them and mutually apply update information. In that case, each of the computers may have the processing modules for the active server and the standby server separately or may use an identical processing module for a common function.

Further, the standby server to which pieces of update information are transferred from the plurality of computers may have a plurality of processing modules corresponding to the pieces of update information, or may use an identical processing module for a common function. In that case, a computer to be added in this invention may also act as an active server by receiving a database update request from the client after data synchronization.

As described above, when this invention is applied to a clustered database system which guarantees data redundancy by holding replicas of data in a plurality of servers, availability of the database system can be improved.

While the present invention has been described in detail and pictorially in the accompanying drawings, the present invention is not limited to such detail but covers various obvious modifications and equivalent arrangements, which fall within the purview of the appended claims.

What is claimed is:

1. A method of adding a new standby computer to a computer system that includes an active computer performing service processing and transmitting update information on data stored in the active computer and a standby computer for maintaining a replica set of the data stored in the active computer by applying the update information transmitted by the active computer to the replica set of the data, the method comprising:
   selecting the standby computer from the computer system;
   initiating accumulation of the update information being transmitted by the active computer in the new standby computer;
   temporally pausing application of the update information by the selected standby computer to the replica set of the data stored in the selected standby computer;
   transferring the replica set of the data stored in the selected standby computer to the new standby computer for storage of the transferred replica set of the data in the new standby computer;
   checking whether the update information transmitted by the active computer that has been applied to the data stored in the active computer has been applied to the replica set of data transferred from the selected standby computer; and
   if the update information transmitted by the active computer that has been applied to the data stored in the active computer has not been applied to the replica set of data transferred from the selected standby computer, applying the update information transmitted by the active computer that has been applied to the data stored in the active computer to the transferred replica set of the data stored in the new standby computer.

2. The method according to claim 1, wherein:
   the active computer comprises a database management system operated therein and the data stored in the active computer is managed by the database management system; and
   the selected standby computer and the new standby computer each comprise a database management system operated therein; and
   the replica set of the data stored in the selected standby computer is managed by the database management system operated therein.

3. The method according to claim 2, wherein the update information includes an update log generated by the database management system operated in the active computer.

4. The method according to claim 1, further comprising resuming application the update information to the replica set of the data stored in the selected standby computer after the selected standby computer transfers the replica set of the data to the new standby computer.

5. The method according to claim 1, wherein selecting the standby computer comprises selecting the standby computer which transfers the replica set of the data in accordance with resource usage of the standby computer included in the computer system.

6. The method according to claim 5, wherein the resource usage of the standby computer used for selecting the standby computer is based on usage of a resource of at least one of a processor, a memory, and a network.

7. The method according to claim 1, wherein the computer system further includes a storage device which stores data; and
   further comprising determining whether the storage device is used to transfer the replica set of the data to the new standby computer in accordance with resource usage of the selected standby computer.

8. The method according to claim 1, wherein the computer system provides a virtual server by logically partitioning a physical resource of the active computer and the standby computer; and wherein transferring the replica set of the data to the new standby computer comprises transferring the replica set of the data upon a change in resource usage by the virtual server if a physical resource of at least one of the selected standby computer and the new standby computer is partitioned for the virtual server.

9. A standby computer for maintaining a replica set of data stored in an active computer in a standby computer, the active computer performing service processing and transmitting update information on the data stored in the active computer upon the data being updated, the standby computer being included in a computer system that includes the active computer, wherein:
   the standby computer is configured to apply the update information transmitted by the active computer to the replica set of data; and
   the standby computer is configured to, upon a new standby computer being added to the computer system:
   initiate accumulation of the update information being transmitted by the active computer and temporarily pause application of the update information to the replica set of the data stored in the standby computer upon receiving a transmission request for the replica set of the data transmitted from the new standby computer;

transfer the replica set of the data stored in the standby computer to the new standby computer for storage of the transferred replica set of the data in the new standby computer;

resume application of the update information to the replica set of the data;

check whether the update information transmitted by the active computer that has been applied to the data stored in the active computer has been applied to the replica set of data transferred from the selected standby computer; and if the update information transmitted by the active computer that has been applied to the data stored in the active computer has not been applied to the replica set of data transferred from the selected standby computer, transfer the update information transmitted by the active computer that has been applied to the data stored in the active computer to the new standby computer for application to the transferred replica set of the data stored in the new standby computer.

10. A computer system comprising an active computer for performing service processing and transmitting update information on data stored in the active computer upon the data being updated and a standby computer for maintaining a replica set of the data stored in the active computer, wherein:

the standby computer is configured to apply the update information transmitted by the active computer to the replica set of data;

a new computer selects the standby computer from the computer system upon the new computer being added as a new standby computer to the computer system, the selected standby computer, upon being selected by the new standby computer, temporarily pauses application of the update information to the replica set of the data stored in the standby computer and transfers the replica set of the data to the new standby computer, the selected standby computer checks whether the update information transmitted by the active computer that has been applied to the data stored in the active computer has been applied to the replica set of data transferred from the selected standby computer; and if the update information transmitted by the active computer that has been applied to the data stored in the active computer has not been applied to the replica set of data transferred from the selected standby computer, one of the active computer and the standby computer, upon the replica set of the data being transferred to the new standby computer, transfers the update information transmitted by the active computer that has been applied to the data stored in the active computer to the new standby computer for application to the transferred replica set of the data stored in the new standby computer.

11. The computer system according to claim 10, wherein:

the active computer comprises a database management system operated therein, and the data stored in the active computer is managed by the database management system operated therein;

the new standby computer and the selected standby computer each comprise a database management system operated therein, and the replica set of the data stored in the standby computer is managed by the database management system operated therein; and the update information includes an update log generated by the database management system operated in the active computer.

12. The computer system according to claim 10, wherein the new standby computer stores the transferred replica set of the data and requests one of the active computer and the standby computer to transmit the update information transmitted by the active computer that has been applied to the data stored in the active computer upon the new standby computer completing storage of the transferred replica set of the data.

13. A method of adding a new standby computer to a computer system that includes an active computer performing service processing and transmitting update information on data stored in the active computer and a standby computer for maintaining a replica set of the data stored in the active computer by applying the update information transmitted by the active computer to the replica set of the data, the method comprising:

selecting the standby computer from the computer system;

upon selection of the standby computer, temporally pausing application of the update information by the selected standby computer to the replica set of the data stored in the selected standby computer and initiating accumulation the update information being transmitted by the active computer in the selected standby computer;

transferring the replica set of the data stored in the selected standby computer to the new standby computer for storage of the transferred replica set of the data in the new standby computer;

upon the replica set of the data being transferred to the new standby computer, resuming application of the update information to the replica set of the data stored in the selected standby computer by the selected standby computer;

checking whether the update information transmitted by the active computer that has been applied to the data stored in the active computer has been applied to the replica set of data transferred from the selected standby computer; and if the update information transmitted by the active computer that has been applied to the data stored in the active computer has not been applied to the replica set of data transferred from the selected standby computer, transferring the update information transmitted by the active computer that has been applied to the data stored in the active computer to the new standby computer for application to the transferred replica set of the data stored in the new standby computer and applying the update information transmitted by the active computer that has been applied to the data stored in the active computer to the transferred replica set of the data stored in the new standby computer.

* * * * *